United States Patent
Kim et al.

(10) Patent No.: US 12,003,297 B2
(45) Date of Patent: Jun. 4, 2024

(54) METHOD FOR TRANSMITTING/RECEIVING CHANNEL STATE INFORMATION ON BASIS OF CODEBOOK HAVING HIGH RESOLUTION IN WIRELESS COMMUNICATION SYSTEM, AND APPARATUS THEREFOR

(71) Applicant: LG ELECTRONICS INC., Seoul (KR)

(72) Inventors: Hyungtae Kim, Seoul (KR); Haewook Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 693 days.

(21) Appl. No.: 17/277,791

(22) PCT Filed: Sep. 20, 2019

(86) PCT No.: PCT/KR2019/012301
§ 371 (c)(1),
(2) Date: Mar. 19, 2021

(87) PCT Pub. No.: WO2020/060337
PCT Pub. Date: Mar. 26, 2020

(65) Prior Publication Data
US 2021/0351824 A1  Nov. 11, 2021

(30) Foreign Application Priority Data

Sep. 21, 2018 (KR) .................. 10-2018-0114464

(51) Int. Cl.
*H04B 7/06* (2006.01)
*H04B 7/0417* (2017.01)
*H04B 7/0456* (2017.01)

(52) U.S. Cl.
CPC ......... *H04B 7/0626* (2013.01); *H04B 7/0417* (2013.01); *H04B 7/0486* (2013.01); *H04B 7/0632* (2013.01); *H04B 7/0639* (2013.01)

(58) Field of Classification Search
CPC .. H04B 7/0417; H04B 7/0486; H04B 7/0626; H04B 7/0632
See application file for complete search history.

(56) References Cited

U.S. PATENT DOCUMENTS

2016/0142123 A1  5/2016  Zhang et al.
2020/0067583 A1* 2/2020  Shin ............... H04L 5/0053

FOREIGN PATENT DOCUMENTS

KR    20110013314    2/2011

OTHER PUBLICATIONS

PCT International Application No. PCT/KR2019/012301, International Search Report dated Jan. 17, 2020, 5 pages.

(Continued)

*Primary Examiner* — Brian P Cox
(74) *Attorney, Agent, or Firm* — LEE, HONG, DEGERMAN, KANG & WAIMEY

(57) ABSTRACT

Disclosed according to the present disclosure are a method for transmitting/receiving channel state information in a wireless communication system, and an apparatus therefor. Method for reporting channel state information by a user equipment comprises the steps of: receiving CSI reporting-related configuration information; wherein a report for at least one of aperiodic CSI, periodic CSI, or semi-persistent CSI is configured based on the CSI reporting-related configuration information, calculating first information and second information for a channel quality; wherein the first information is calculated by applying a precoding matrix indicator (PMI) included in latest aperiodically reported CSI, and the second information is calculated by applying (Continued)

the PMI at a time of calculation of the second information, and determining at least one of whether to transmit a flag and a value of the flag; and transmitting CSI to the base station based on the first information and the flag.

15 Claims, 14 Drawing Sheets

(56) References Cited

OTHER PUBLICATIONS

Ericsson, "On CSI reporting," 3GPP TSG-RAN WG1 NR Ad Hoc#3, R1-1716349, Sep. 2017, 10 pages.
LG Electronics, "Remaining issues on CSI reporting, " 3GPP TSG RAN WG1 Meeting#93, R1-1806609, May 2018, 11 pages.
NTT Docomo, "Remaining details on BM and CSI framework," 3GPP TSG RAN WG1 Meeting#91, R1-1720806, Dec. 2017, 6 pages.

\* cited by examiner

【FIG. 1】
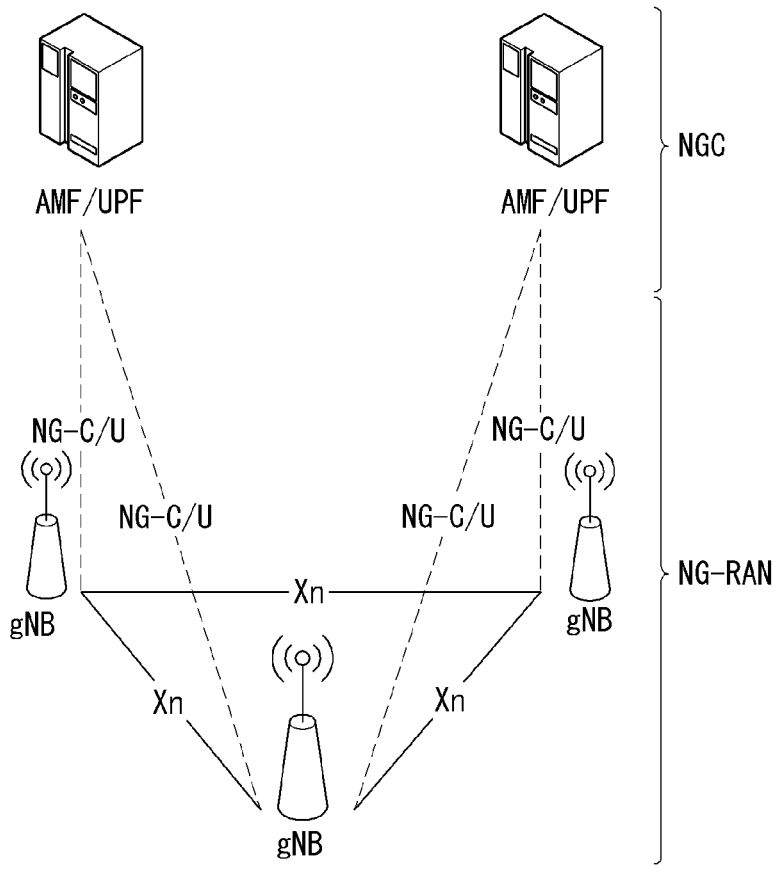
【FIG. 2】
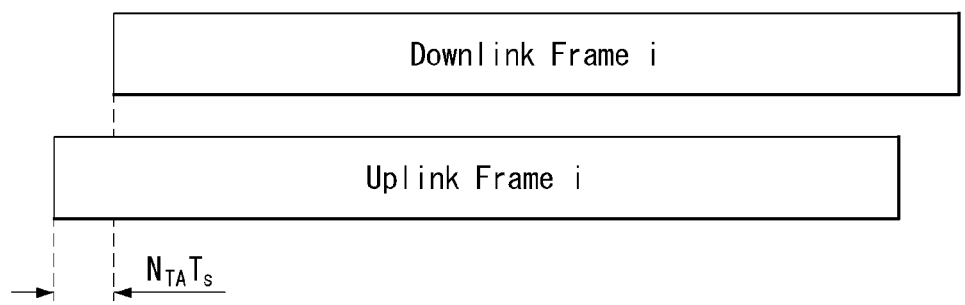

[FIG. 3]
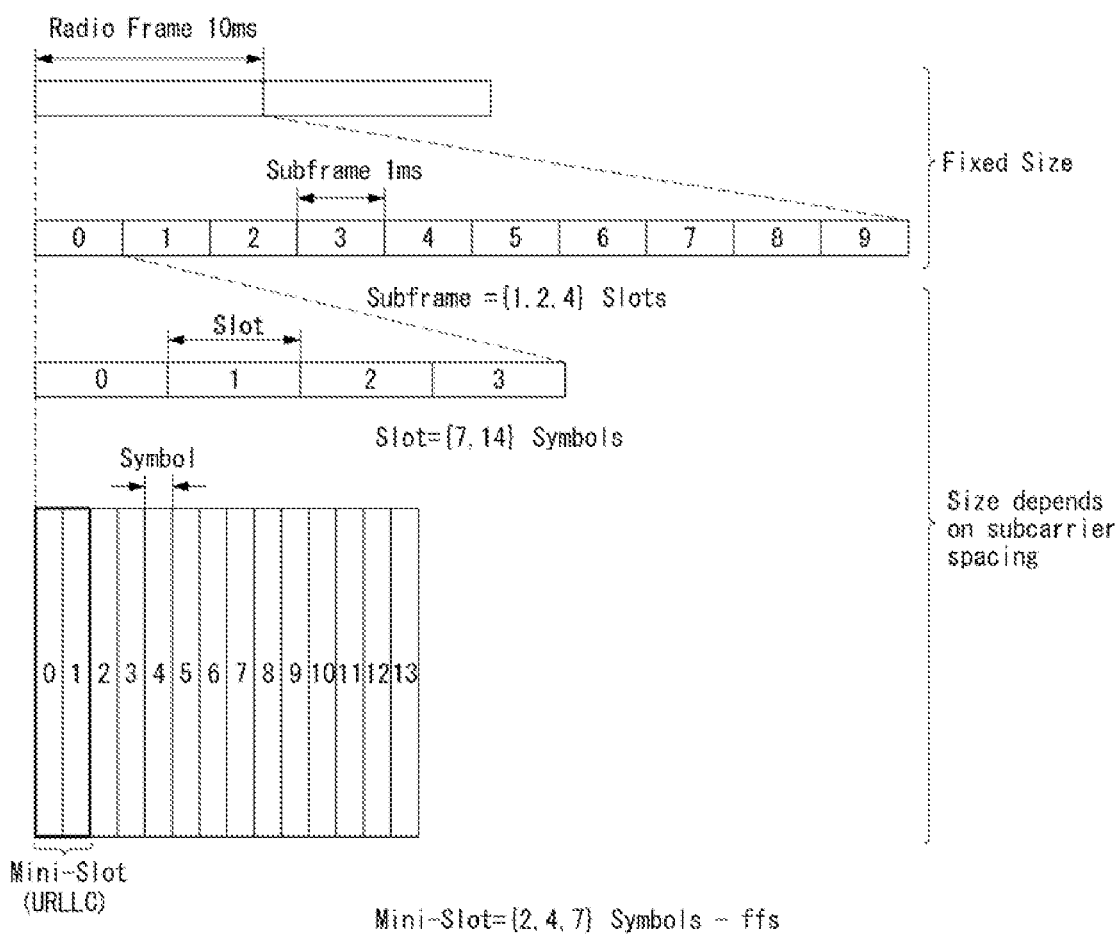

[FIG. 4]
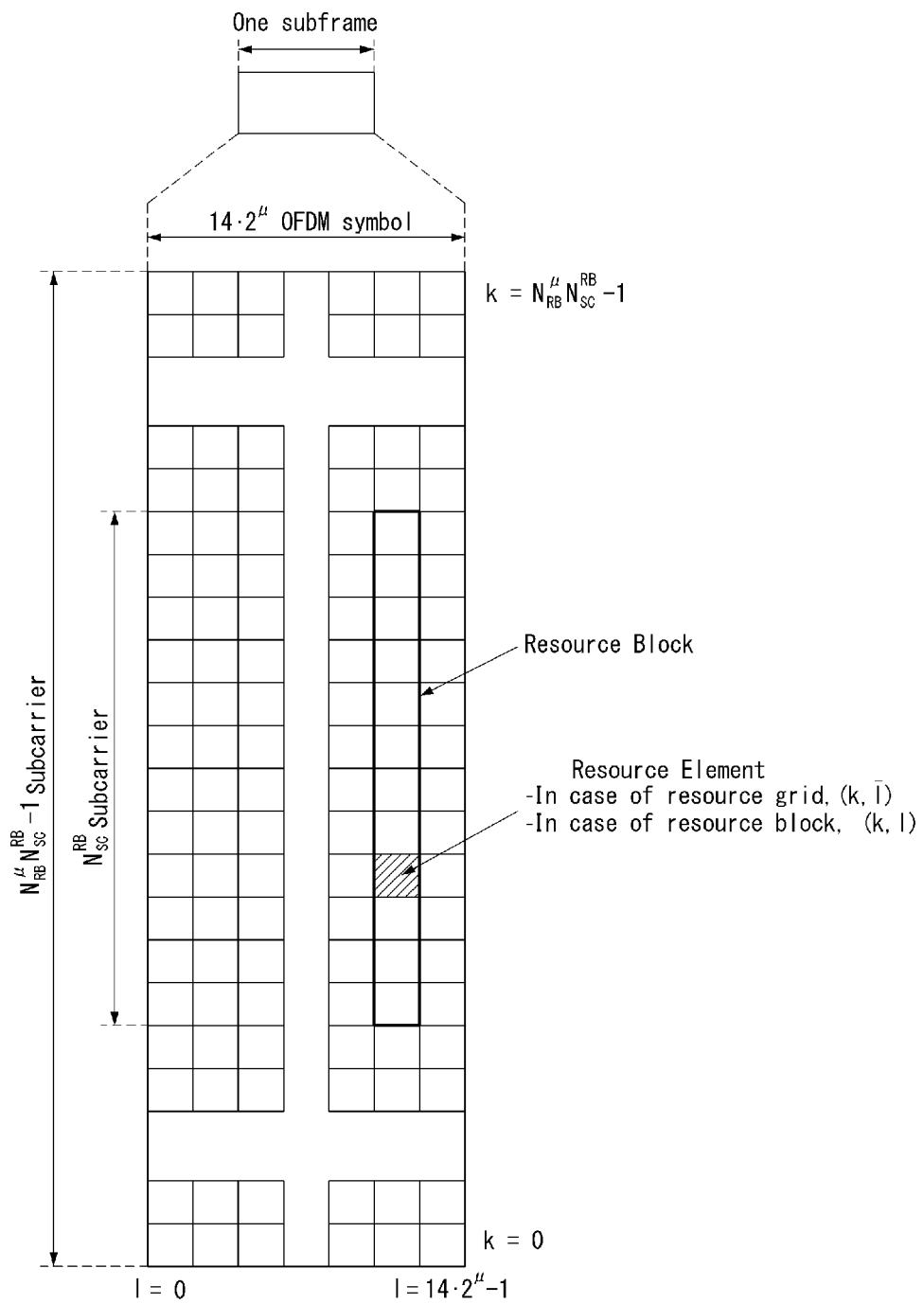

[FIG. 5]
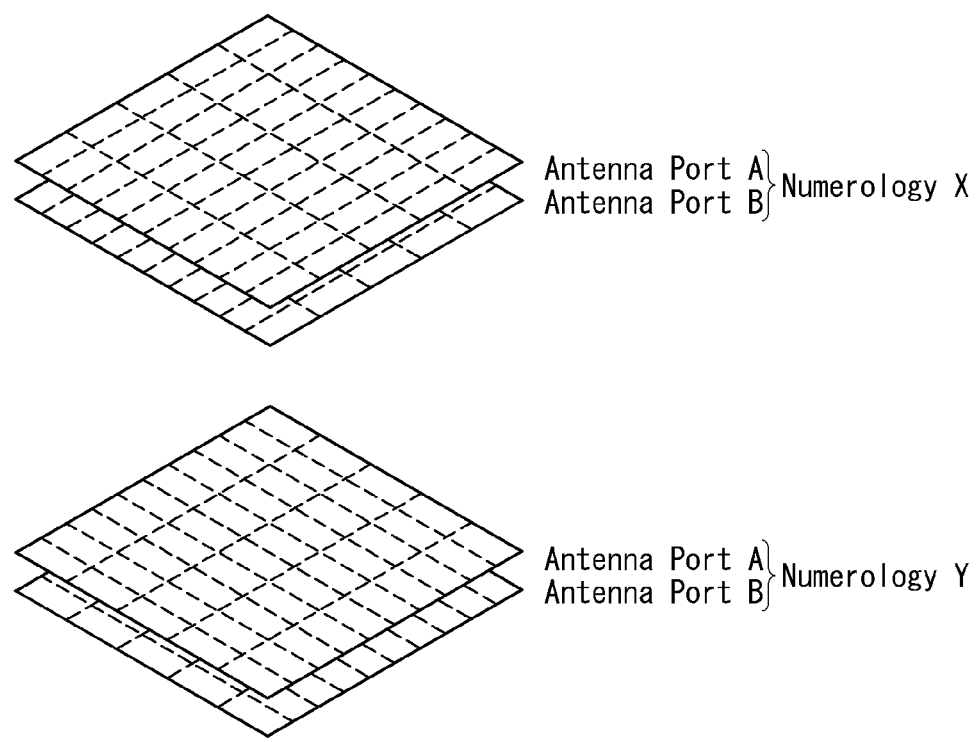

[FIG. 6]
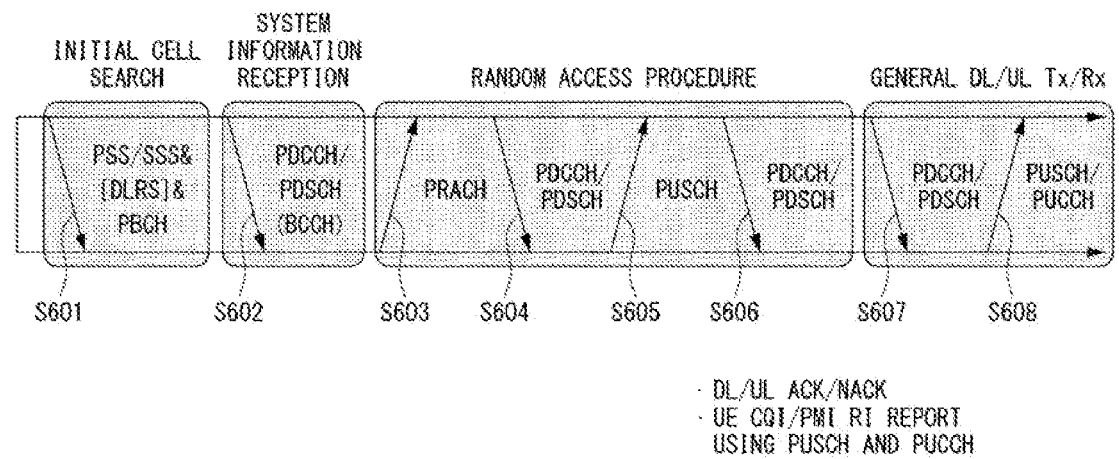
[FIG. 7]
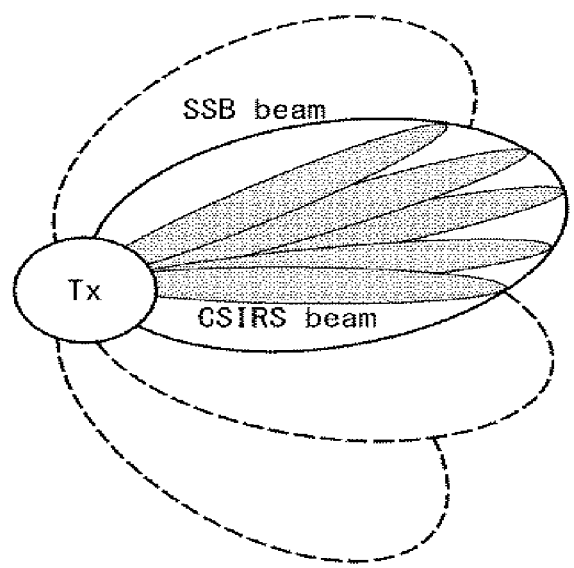

[FIG. 8]
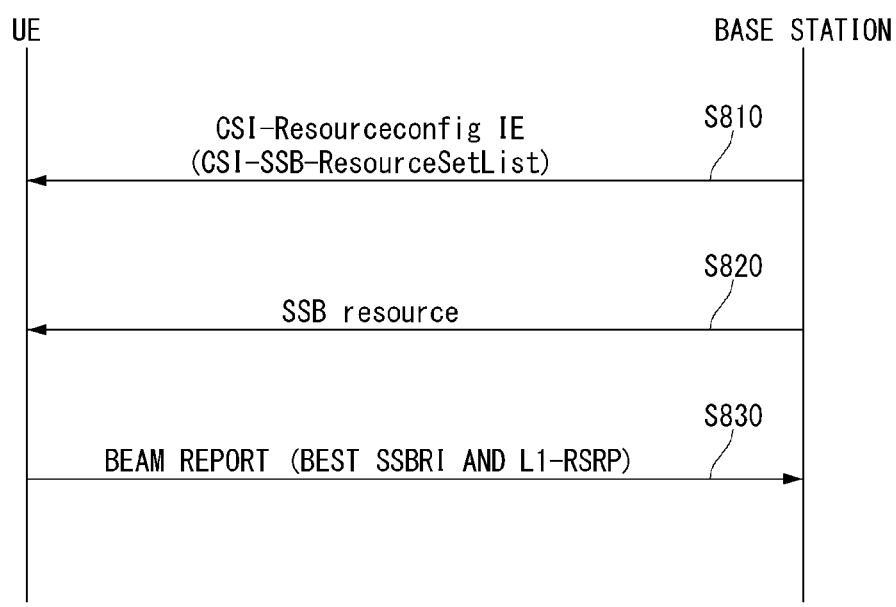

[FIG. 9]
(a)
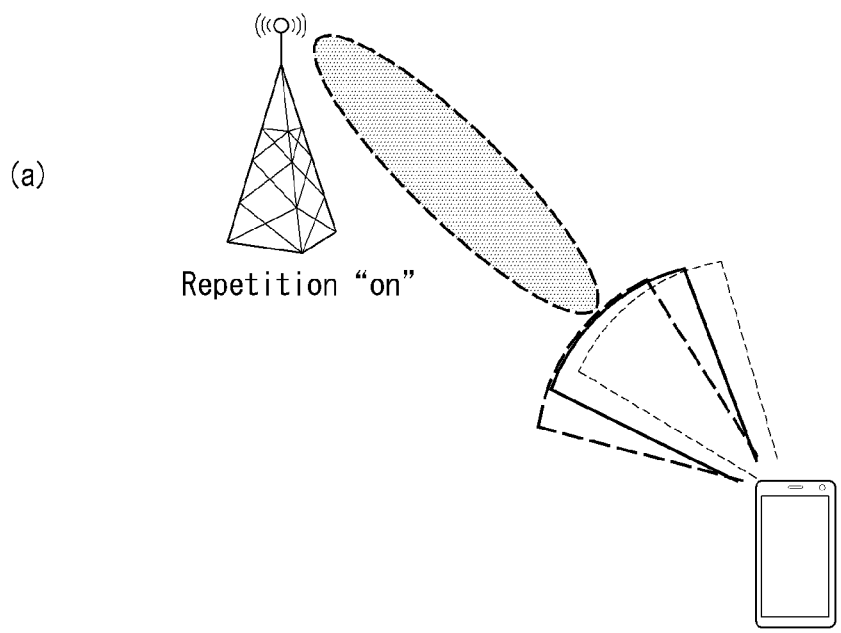
Repetition "on"
(b)
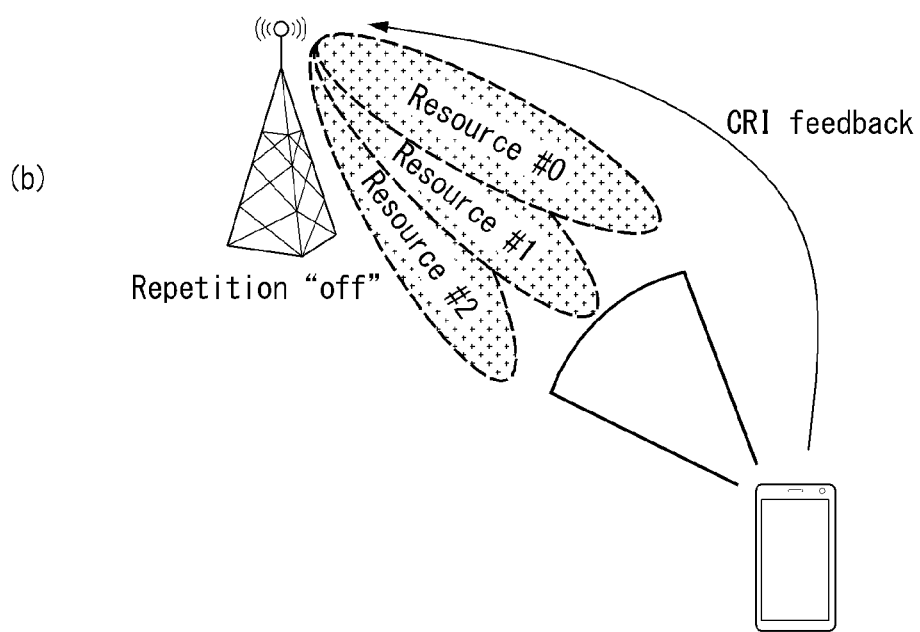
Repetition "off"

[FIG. 10]
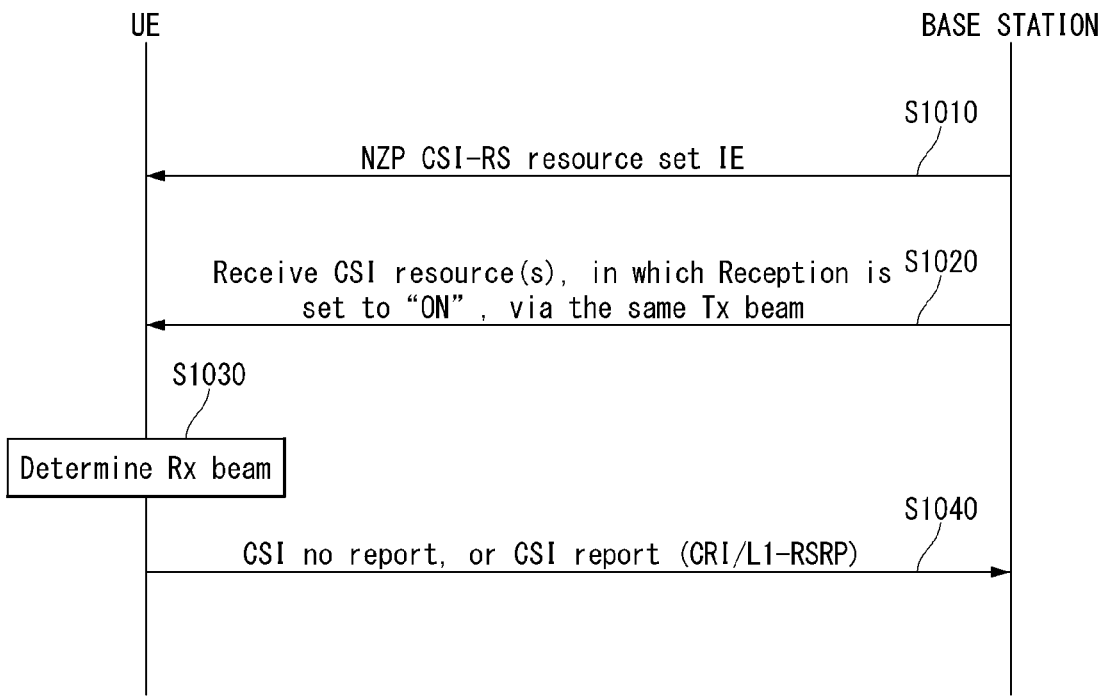
[FIG. 11]
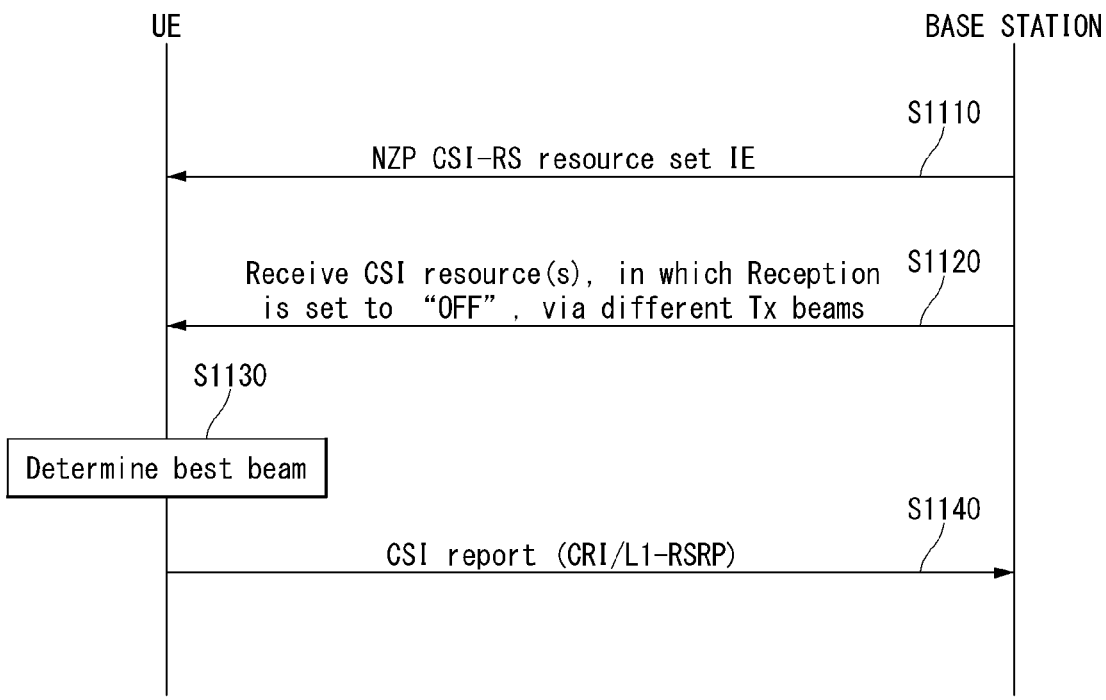

[FIG. 12]
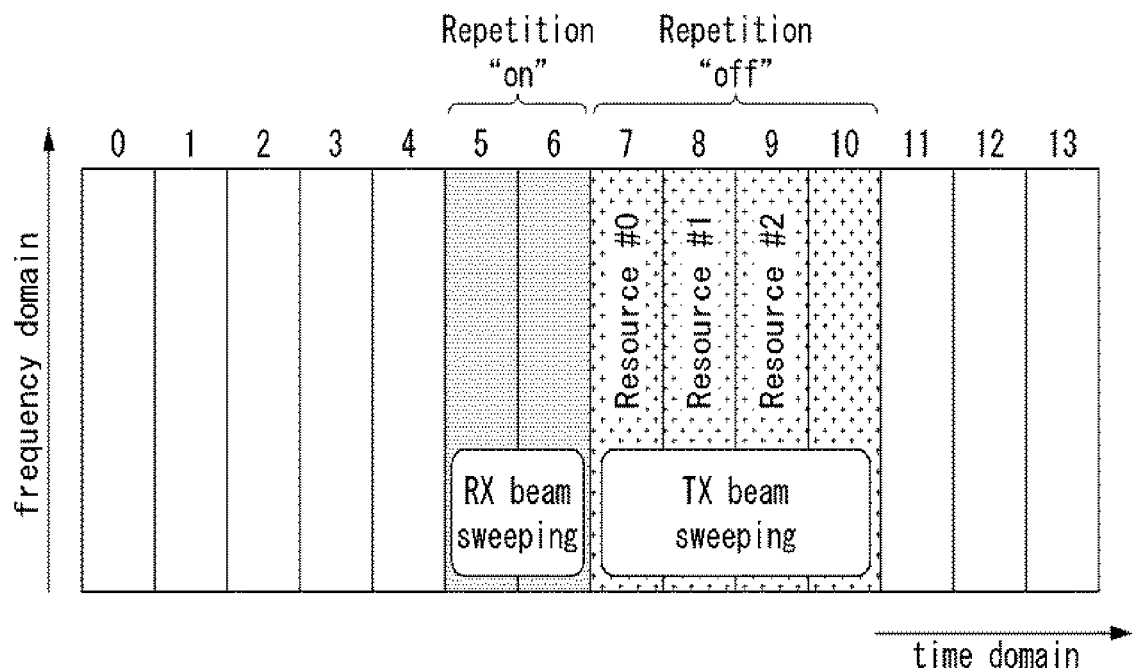
[FIG. 13]
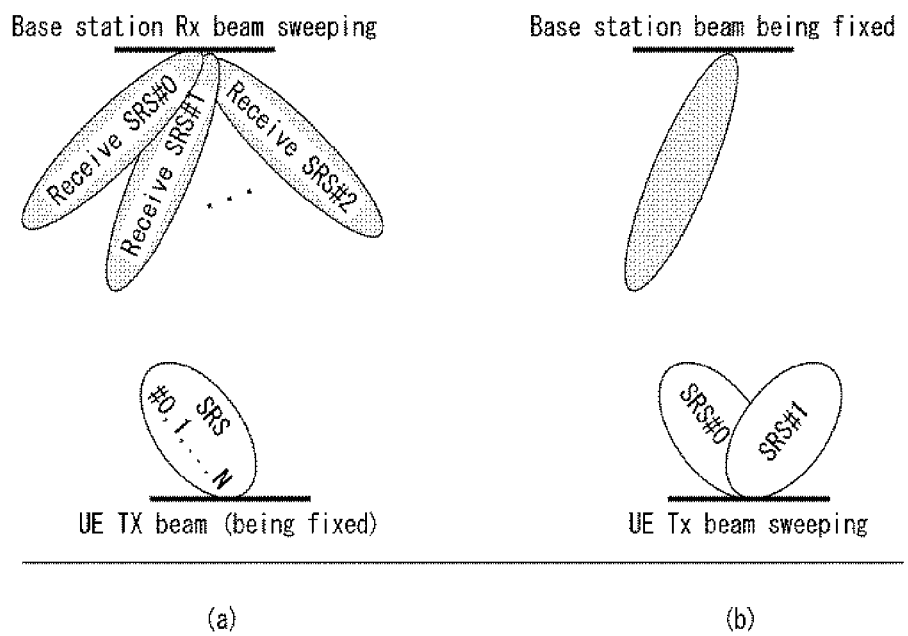

[FIG. 14]
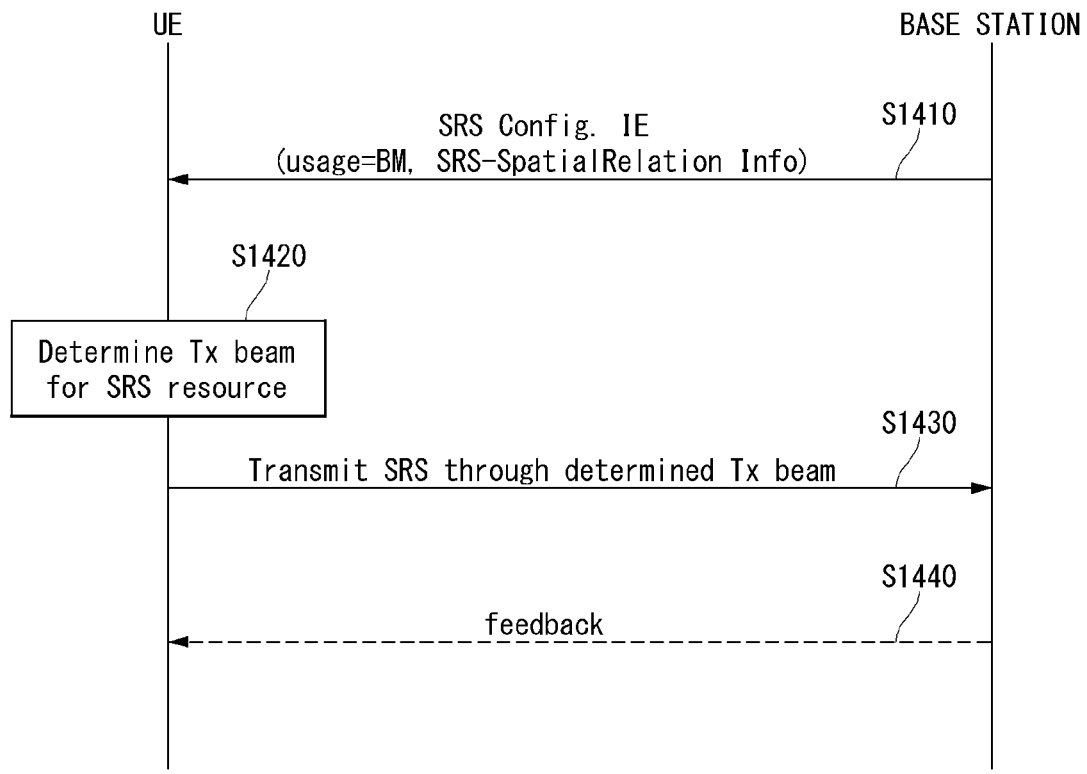
[FIG. 15]
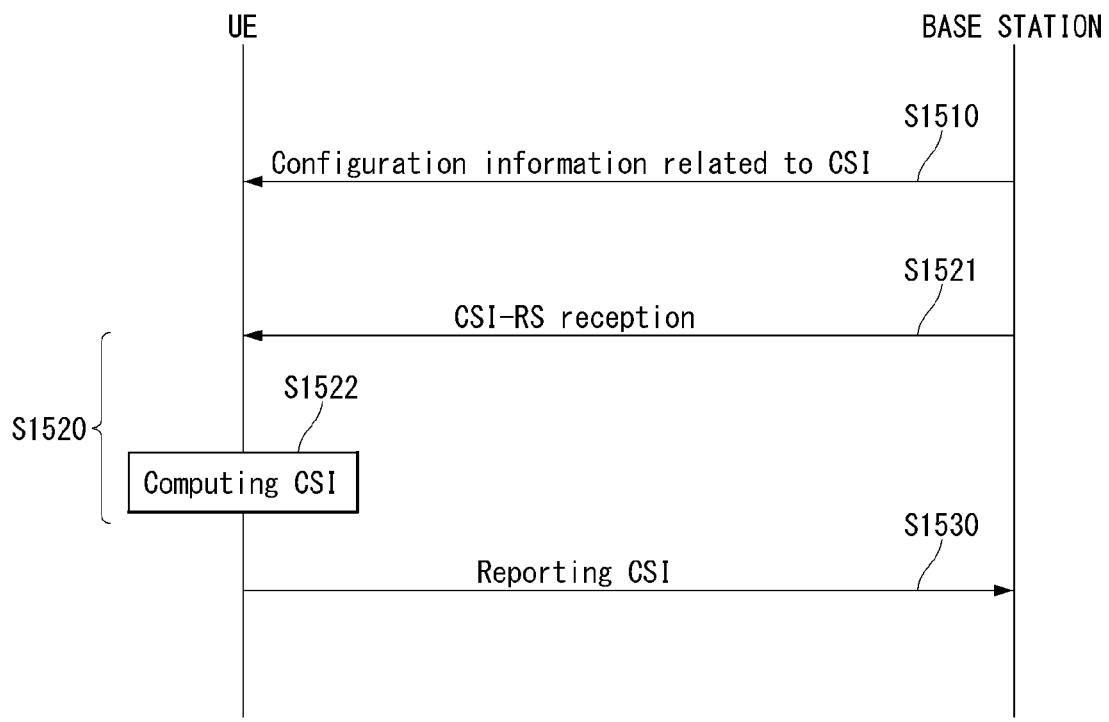

[FIG. 16]
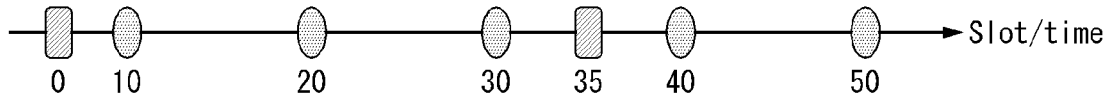
☒ Trigger based CSI1 (e.g. RI/PMI/CQI) (Using PUSCH)
⬭ Periodic/semi-persistent feedback based CSI2 (e.g. CQI/CQIopt) (Using PUCCH)
[FIG. 17]
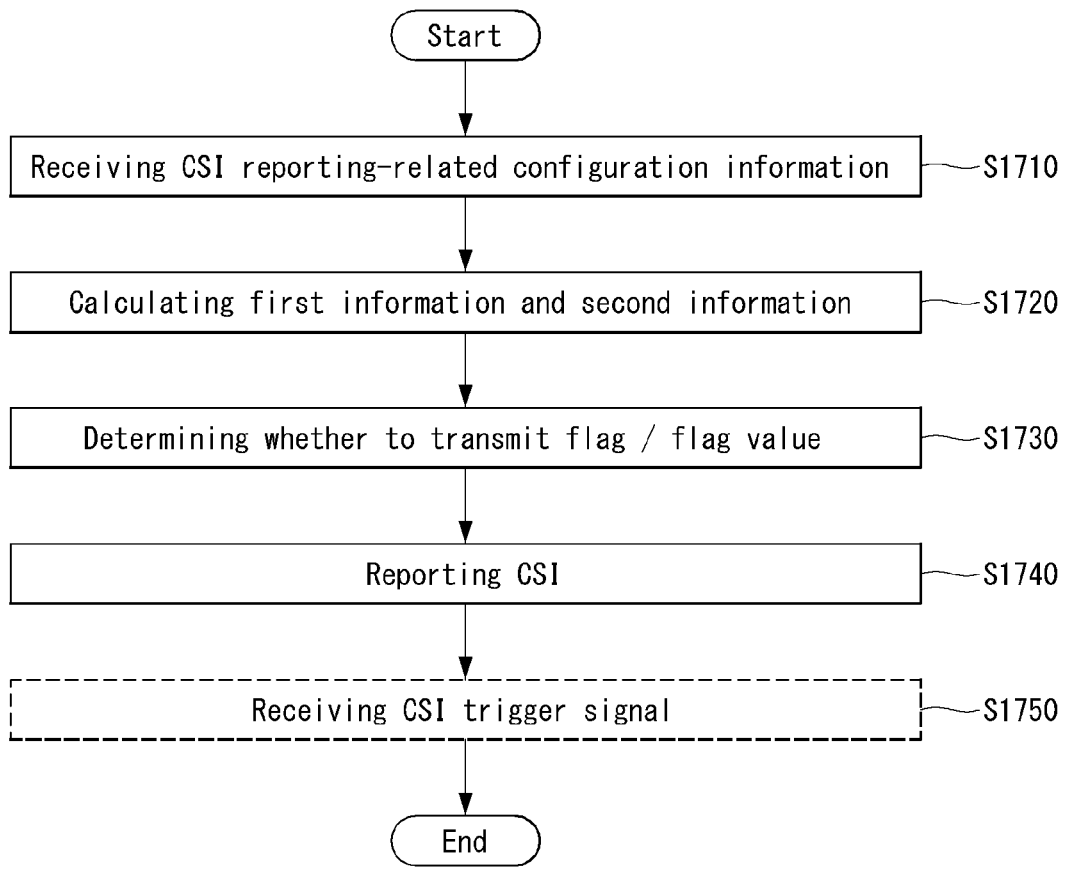

[FIG. 18]
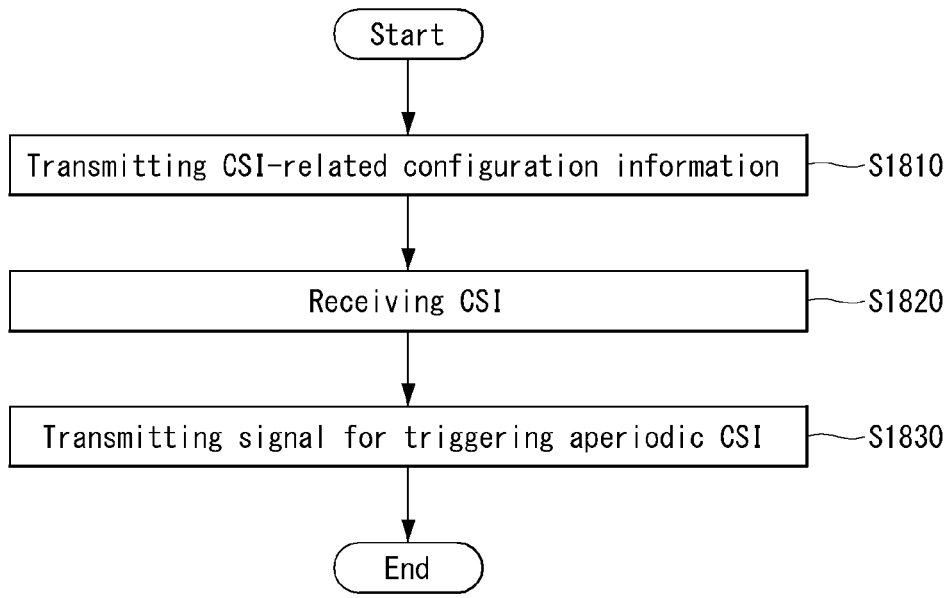
[FIG. 19]
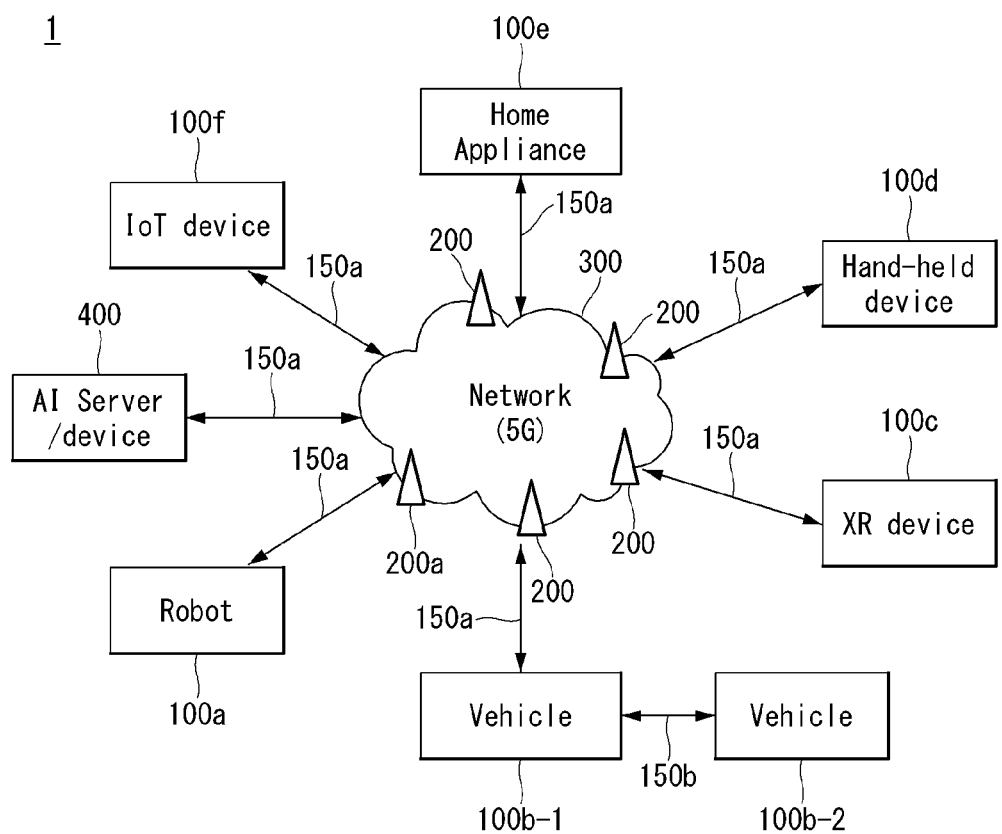

【FIG. 20】
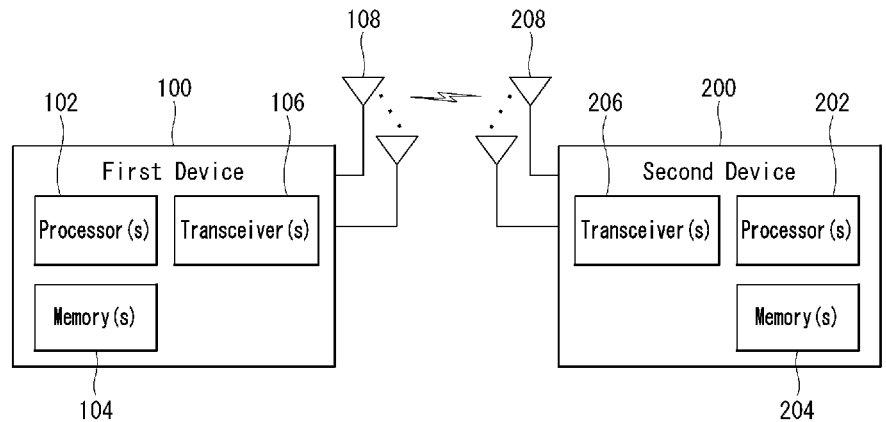
【FIG. 21】
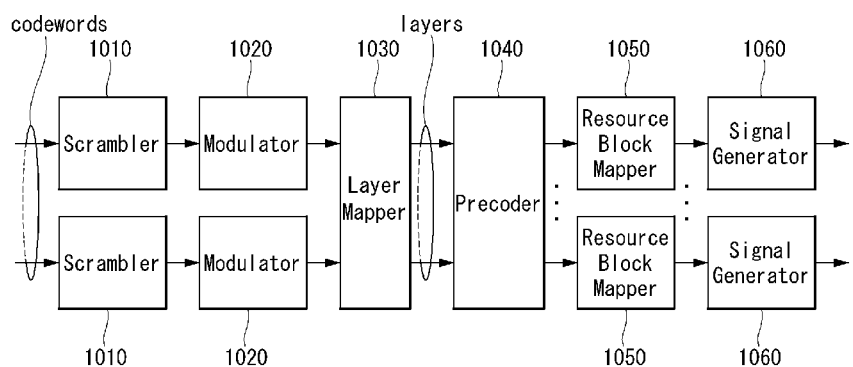
【FIG. 22】
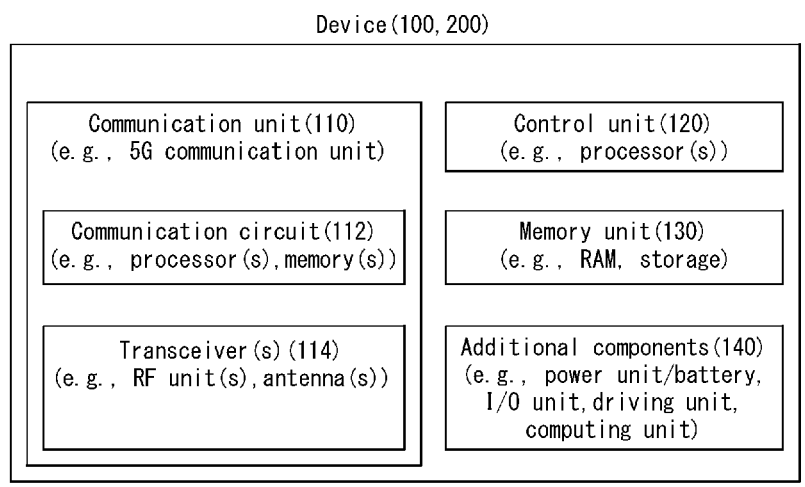

[FIG. 23]
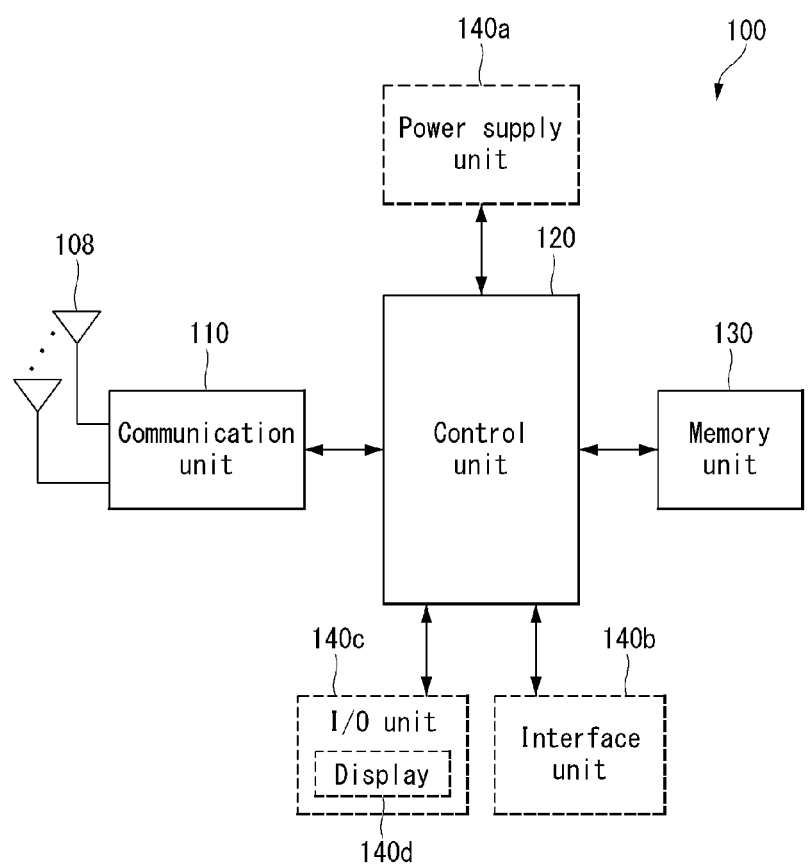

METHOD FOR TRANSMITTING/RECEIVING CHANNEL STATE INFORMATION ON BASIS OF CODEBOOK HAVING HIGH RESOLUTION IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2019/012301, filed on Sep. 20, 2019, which claims the benefit of earlier filing date and right of priority to KR Application No. 10-2018-0114464, filed on Sep. 21, 2018, the contents of which is incorporated by reference herein in its entirety.

TECHNICAL FIELD

The present disclosure relates to a wireless communication system, and more specifically, to a method for transmitting and receiving channel state information (CSI) based on a codebook having high resolution, and an apparatus supporting the same.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to be able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

The present disclosure proposes a method for transmitting and receiving channel state information (CSI) based on a codebook having high resolution in a wireless communication system.

Specifically, the present disclosure proposes a method for reporting CSI having a large payload size aperiodically, and reporting CSI having a small payload size periodically/semi-persistently by classifying the CSI according to the payload size.

In addition, the present disclosure proposes a method for reporting periodically/semi-persistently by calculating CQI applying latest aperiodically reported PMI/RI and the CQI applying the PMI/RI at a time of CSI calculation.

In addition, the present disclosure proposes a method for reporting periodically/semi-persistently a flag for a difference value between the CQI applying the latest aperiodically reported PMI/RI and the CQI applying the PMI/RI at the time of CSI calculation.

In addition, the present disclosure proposes a method for transmitting a signal for triggering an aperiodic CSI reporting based on the received CSI.

Technical problems to be solved by the present disclosure are not limited by the above-mentioned technical problems, and other technical problems which are not mentioned above can be clearly understood from the following description by those skilled in the art to which the present disclosure pertains.

Technical Solution

A method for reporting channel state information (CSI) by a user equipment (UE) in a wireless communication system according to an embodiment of the present disclosure, the method includes receiving CSI reporting-related configuration information from a base station; wherein a report for at least one of aperiodic CSI, periodic CSI, or semi-persistent CSI is configured based on the CSI reporting-related configuration information, calculating first information and second information for a channel quality, based on the CSI reporting-related configuration information; wherein the first information is calculated by applying a precoding matrix indicator (PMI) included in latest aperiodically reported CSI, and the second information is calculated by applying the PMI at a time of calculation of the second information, and determining at least one of whether to transmit a flag and a value of the flag, based on the first information and the second information; and transmitting the CSI to the base station based on the first information and the flag.

In addition, in the method according to an embodiment of the present disclosure, the CSI may correspond to the report on the periodic CSI or the semi-persistent CSI.

In addition, in the method according to an embodiment of the present disclosure, whether to transmit the flag may be determined by transmitting the flag when a difference between the first information and the second information is greater than or equal to a specific value.

In addition, in the method according to an embodiment of the present disclosure, the specific value may be configured by the base station.

In addition, in the method according to an embodiment of the present disclosure, the CSI may include the first information and the flag.

In addition, in the method according to an embodiment of the present disclosure, the value of the flag may be determined by comparing a difference value between the first information and the second information and a specific value.

In addition, in the method according to an embodiment of the present disclosure, the flag may consist of 1 bit, i) when the difference between the first information and the second information is greater than or equal to the specific value, 1 may be transmitted, and ii) when the difference between the first information and the second information is less than the specific value, 0 may be transmitted.

In addition, in the method according to an embodiment of the present disclosure, a plurality of sets consisting of candidate values of a difference value between the first information and the second information may be configured, the flag may consist of two or more bits, and the value of the flag may indicate a set corresponding to the difference value between the first information and the second information among the plurality of sets.

In addition, in the method according to an embodiment of the present disclosure, a plurality of the specific values may be configured, and the value of the flag may indicate whether the difference value between the first information and the second information is greater than or equal to a specific value among the plurality of specific values.

In addition, in the method according to an embodiment of the present disclosure, when the CSI corresponds to a subband report, the first information may be reported in subband units, and the flag may be reported in wideband units.

In addition, in the method according to an embodiment of the present disclosure, the method may further include receiving a trigger signal for the report on the aperiodic CSI from the base station, and wherein the trigger signal may be transmitted from the base station based on the flag.

In addition, in the method according to an embodiment of the present disclosure, the method may further include transmitting the aperiodic CSI to the base station in response to the trigger signal, and wherein the aperiodic CSI may include at least one of the PMI and RI.

A user equipment (UE) for reporting channel state information (CSI) in a wireless communication system according to an embodiment of the present disclosure, the UE includes a transceiver configured to transmit and receive a radio signal, and a processor functionally connected to the transceiver, wherein the processor is configured to receive CSI reporting-related configuration information from a base station by controlling the transceiver, wherein a report for at least one of aperiodic CSI, periodic CSI, or semi-persistent CSI is configured based on the CSI reporting-related configuration information, calculate first information and second information for a channel quality, based on the CSI reporting-related configuration information, calculate the first information by applying a precoding matrix indicator (PMI) included in latest aperiodically reported CSI, and calculate the second information by applying the PMI at a time of calculation of the second information, and determine at least one of whether to transmit a flag and a value of the flag, based on the first information and the second information, and transmit the CSI to the base station based on the first information and the flag.

In addition, in the UE according to an embodiment of the present disclosure, it may be determined by transmitting the flag when a difference between the first information and the second information is greater than or equal to a specific value.

In addition, in the UE according to an embodiment of the present disclosure, the CSI may include the first information and the flag.

Advantageous Effects

According to an embodiment of the present disclosure, by reporting the CSI having a large payload size aperiodically based on the request of the base station, it is possible to use uplink resources required for CSI reporting efficiently.

In addition, according to an embodiment of the present disclosure, by reporting a flag for a difference value between the CQI applying the latest aperiodically reported PMI/RI and the CQI applying the PMI/RI at the time of CSI calculation, it is possible to enable the base station to determine whether a trigger for PMI/RI feedback is required by using fewer uplink resources.

In addition, according to an embodiment of the present disclosure, based on the CSI periodically or semi-persistently reported by the UE, the base station may determine whether PMI/RI needs to be updated, and trigger aperiodic CSI reporting for PMI/RI update.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a frame structure in an NR system.

FIG. 4 illustrates an example of a resource grid supported by a wireless communication system to which a method proposed in the present disclosure may be applied.

FIG. 5 illustrates examples of a resource grid for each antenna port and numerology to which a method proposed in the present disclosure may be applied.

FIG. 6 illustrates physical channels and general signal transmission used in a 3GPP system.

FIG. 7 illustrates an example of beam forming using SSB and CSI-RS.

FIG. 8 is a flowchart for illustrating a downlink beam management procedure using SSB.

FIG. 9 illustrates for illustrating a downlink beam management procedure using CSI-RS.

FIG. 10 is a diagram for explaining a procedure for determining a reception beam in a downlink beam management procedure using CSI-RS.

FIG. 11 is a diagram for explaining a procedure for determining a transmission beam in a downlink beam management procedure using CSI-RS.

FIG. 12 is a diagram for explaining resource allocation in time and frequency domains in a downlink beam management procedure using CSI-RS.

FIG. 13 is a diagram for explaining an uplink beam management procedure using SRS.

FIG. 14 is a flowchart illustrating an uplink beam management procedure using SRS.

FIG. 15 is a flowchart showing an example of a CSI related procedure.

FIG. 16 shows an example in which CSI reporting is performed per time slot to which a method proposed in the present disclosure can be applied.

FIG. 17 shows an example of an operation flowchart of a UE performing a CSI reporting to which a method and/or embodiment proposed in the present disclosure can be applied.

FIG. 18 shows an example of an operation flowchart of a base station receiving a CSI reporting to which a method and/or embodiment proposed in the present disclosure can be applied.

FIG. 19 illustrates a communication system 1 applied to the present disclosure.

FIG. 20 illustrates a wireless device applicable to the present disclosure.

FIG. 21 illustrates a signal processing circuit for a transmission signal.

FIG. 22 illustrates another example of a wireless device applied to the present disclosure.

FIG. 23 illustrates a portable device applied to the present disclosure.

MODE FOR INVENTION

A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), AR (Augmented Reality) device, VR (Virtual Reality) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, an Unmanned Aerial Vehicle (UAV), AR (Augmented Reality) device, VR (Virtual Reality) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the present disclosure may be referred to for a background art, terms, abbreviations, etc., used for describing the present disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billion. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of an NR system to which a method proposed in the present disclosure is applicable.

Referring to FIG. 1, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s = 1/(\Delta f_{max} \cdot N_f)$. In this case, $\Delta f_{max} = 480 \cdot 10^3$, and $N_f = 4096$. DL and UL transmission is configured as a radio frame having a section of $T_f = (\Delta f_{max} N_f / 100) \cdot T_s = 10$ ms. The radio frame is composed of ten subframes each having a section of $T_{sf} = (\Delta f_{max} N_f / 1000) \cdot T_s = 1$ ms. In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA} = N_{TA}T_s$ before the start of a corresponding downlink frame at the corresponding UE.

Regarding the numerology μ, slots are numbered in increasing order of $n_s^\mu \in \{0, \ldots, N_{subframe}^{slots, \mu} - 1\}$ within a subframe and are numbered in increasing order of $n_{s,f}^\mu \in \{0, \ldots, N_{frame}^{slots, \mu} - 1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 2 represents the number $N_{symb}^{slot}$ of OFDM symbols per slot, the number $N_{slot}^{frame, \mu}$ of slots per radio frame, and the number slot $N_{slot}^{subframe, \mu}$ of slots per subframe in a normal CP. Table 3 represents the number of OFDM symbols per slot, the number of slots per radio frame, and the number of slots per subframe in an extended CP.

TABLE 2

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 10

| CSI-RS Configuration | Periodic CSI Reporting | Semi-Persistent CSI Reporting | Aperiodic CSI Reporting |
| --- | --- | --- | --- |
| Periodic CSI-RS | No dynamic triggering/ activation | For reporting on PUCCH, the UE receives an activation command; for reporting on PUSCH, the UE receives triggering on DCI | Triggered by DCI; additionally, activation command possible |
| Semi-Persistent CSI-RS | Not Supported | For reporting on PUCCH, the UE receives an activation command; for reporting on PUSCH, the UE receives triggering on DCI | Triggered by DCI; additionally, activation command possible |
| Aperiodic CSI-RS | Not Supported | Not Supported | Triggered by DCI; additionally, activation command possible |

FIG. 3 illustrates an example of a frame structure in a NR system. FIG. 3 is merely for convenience of explanation and does not limit the scope of the present disclosure.

In Table 3, in case of μ=2, i.e., as an example in which a subcarrier spacing (SCS) is 60 kHz, one subframe (or frame) may include four slots with reference to Table 2, and one subframe={1, 2, 4} slots shown in FIG. 3, for example, the number of slot(s) that may be included in one subframe may be defined as in Table 2.

Further, a mini-slot may consist of 2, 4, or 7 symbols, or may consist of more symbols or less symbols.

In relation to physical resources in the NR system, an antenna port, a resource grid, a resource element, a resource block, a carrier part, etc., may be considered.

Hereinafter, the above physical resources that may be considered in the NR system are described in more detail.

First, in relation to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu} N_{sc}^{RB}$ subcarriers on a frequency domain, each subframe consisting of 14·2μ OFDM symbols, but the disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max, \mu}$. $N_{RB}^{max, \mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k, l̄), where k=0, . . . , $N_{RB}^{\mu} N_{sc}^{RB}-1$ is an index on a frequency domain, and l̄=0, . . . , $2^{\mu} N_{symb}^{(\mu)}-1$ refers to a location of a symbol in a subframe. The index pair (k, l) is used to refer to a resource element in a slot, where l=0, . . . , $N_{symb}^{\mu}-1$.

The resource element (k, l̄) for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB}=n_{PRB}+N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

DL Beam Management (DL BM) Procedure

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using SSB and CSI-RS.

As illustrated in FIG. 7, an SSB beam and a CSI-RS beam may be used for the beam management. A measurement metric is an L1-RSRP for each resource/block. The SSB may be sued for coarse beam management and the CSI-RS may be sued for fine beam management. The SSB may be used for both the Tx beam sweeping and the Rx beam sweeping. The Rx beam sweeping using the SSB may be performed while the UE changes the Rx beam for the same SSBRI across multiple SSB bursts. Here, one SS burst includes one or more SSBs and one SS burst set includes one or more SSB bursts.

1. DL BM Using SSB

FIG. 8 is a flowchart showing an example of a downlink beam management procedure using SSB.

A configuration for beam report using the SSB is performed during a CSI/beam configuration in an RRC connected state (or RRC connected mode).

The UE receives from the eNB CSI-ResourceConfig IE including CSI-SSB-ResourceSetList including SSB resources used for the BM (S810).

Table 4 shows an example of CSI-ResourceConfig IE and as shown in Table 4, a BM configuration using the SSB is not separately defined and the SSB is configured like the CSI-RS resource.

TABLE 4

-- ASN1START
-- TAG-CSI-RESOURCECONFIG-START
CSI-ResourceConfig ::=           SEQUENCE {
    csi-ResourceConfigId             CSI-ResourceConfigId, TABLE 4-continued

```
    csi-RS-ResourceSetList              CHOICE {
        nzp-CSI-RS-SSB                  SEQUENCE {
            nzp-CSI-RS-ResourceSetList      SEQUENCE (SIZE
(1..maxNrofNZP-CSI-RS-ResourceSetsPerConfig)) OF NZP-CSI-RS-ResourceSetId
OPTIONAL,
            csi-SSB-ResourceSetList         SEQUENCE (SIZE
(1..maxNrofCSI-SSB-ResourceSetsPerConfig)) OF CSI-SSB-ResourceSetIdOPTIONAL
        },
        csi-IM-ResourceSetList          SEQUENCE (SIZE (1..maxNrofCSI-IM-
ResourceSetsPerConfig)) OF CSI-IM-ResourceSetId
    },
    bwp-Id                          BWP-Id,
    resourceType                    ENUMERATED { aperiodic, semiPersistent,
periodic },
    ...
}
-- TAG-CSI-RESOURCECONFIGTOADDMOD-STOP
-- ASN1STOP
```

In Table 4, csi-SSB-ResourceSetList parameter represents a list of SSB resources used for beam management and reporting in one resource set. Here, SSB resource set may be configured as {SSBx1, SSBx2, SSBx3, SSBx4, . . . }. SSB index may be defined as 0 to 63.

The UE receives from the eNB the SSB resource based on the CSI-SSB-ResourceSetList (S820).

When CSI-RS reportConfig associated with reporting of SSBRI and L1-RSRP is configured, the UE (beam) reports to the eNB best SSBRI and L1-RSRP corresponding thereto (S830).

In other words, when reportQuantity of the CSI-RS reportConfig IE is configured as 'ssb-Index-RSRP', the UE reports to the eNB best SSBRI and L1-RSRP corresponding thereto.

In addition, when the CSI-RS resource is configured in the same OFDM symbol(s) as SSB (SS/PBCH Block) and 'QCL-TypeD' is applicable, the UE may assume that the CSI-RS and the SSB are quasi co-located from the viewpoint of 'QCL-TypeD'.

Here, the QCL TypeD may mean that antenna ports are QCL from the viewpoint of a spatial Rx parameter. When the UE receives a plurality of DL antenna ports having a QCL Type D relationship, the same Rx beam may be applied. Further, the UE does not expect that the CSI-RS is configured in an RE overlapped with the RE of the SSB.

2. DL BM Procedure Using CSI-RS

When the UE receives a configuration of NZP-CSI-RS-ResourceSet with (higher layer parameter) repetition configured to 'ON', the UE may assume that at least one CSI-RS resource in NZP-CSI-RS-ResourceSet is transmitted to the same downlink spatial domain transmission filter.

In other words, at least one CSI-RS resource in NZP-CSI-RS-ResourceSet is transmitted through the same Tx beam.

Here, at least one CSI-RS resource in NZP-CSI-RS-ResourceSet may be transmitted to different OFDM symbols or transmitted in different frequency domain (i.e. through FDM).

When the UE is a multi-panel UE, at least one CSI-RS resource is a target of FDM.

In addition, when the repetition is configured to "ON", it is related to the Rx beam sweeping procedure of the UE.

The UE does not expect that different periodicities are received at periodicityAndOffset in all CSI-RS resources in NZP-CSI-RS-Resourceset.

In addition, when repetition is configured to 'OFF', the UE does not assume that at least one CSI-RS resource in NZP-CSI-RS-ResourceSet is transmitted to the same downlink spatial domain transmission filter.

In other words, at least one CSI-RS resource in NZP-CSI-RS-ResourceSet is transmitted through different Tx beams.

When the repetition is configured to "OFF", it is related to the Tx beam sweeping procedure of the eNB.

In addition, the repetition parameter may be configured only for CSI-RS resource sets associated with CSI-ReportConfig having a report of L1 RSRP or 'No Report (or None)'.

When the UE is configured with CSI-ReportConfig in which reportQuantity is configured as 'cri-RSRP' or 'none', the UE may be configured only with the same number of port (1-port or 2-port) having higher layer parameter 'nrofPorts' for all CSI-RS resources in NZP-CSI-RS-ResourceSet. Here, CSI-ResourceConfig does not include the higher layer parameter "trs-Info" but includes NZP-CSI-RS-ResourceSet configured to the higher layer parameter "repetition" (=ON).

More specifically, with respect to the purpose of the CSI-RS, if parameter repetition is configured and TRS_info is not configured in a specific CSI-RS resourceset, the CSI-RS is used for beam management.

In addition, if parameter repetition is not configured and TRS_info is configured, the CSI-RS is used as a TRS (Tracking Reference Signal).

In addition, if neither parameter repetition nor TRS_info is configured, the CSI-RS is used for CSI acquisition.

FIG. 9 illustrates an example of a downlink beam management procedure using a Channel State Information-Reference Signal (CSI-RS).

(a) of FIG. 9 illustrates an Rx beam determination (or refinement) procedure of the UE and (b) of FIG. 9 illustrates a Tx beam sweeping procedure of the eNB. Further, (b) of FIG. 9 illustrates a case where the repetition parameter is configured to 'ON' and (b) of FIG. 9 illustrates a case where the repetition parameter is configured to 'OFF'.

Referring to (a) of FIG. 9 and FIG. 10, an Rx beam determination process of the UE will be described.

FIG. 10 is a flowchart showing an example of a RX beam determination process of a UE in the DL BM procedure using CSI-RS.

In the FIG. 10, the UE receives, from the eNB, NZP CSI-RS resource set IE including higher layer parameter repetition through RRC signaling (S1010). Here, the repetition parameter is configured to 'ON'.

The UE repeatedly receives a resource(s) in CSI-RS resource set configured as repetition 'ON' in different OFDM symbols through the same Tx beam (or DL spatial domain transmission filter) of the eNB (S1020).

The UE determines the Rx beam thereof (S1030).

The UE may skip a CSI report and transmit a CSI report including CRI/L1-RSRP to the eNB (S1040).

In this case, reportQuantity of CSI report config may be configured as "No report (or None)" or CRI and L1-RSRP".

That is, when repetition is configured to "ON", the UE may skip the CSI report or report ID information (CRI) of a beam pair related priority beam and a quality value (L1-RSRP) thereof.

Referring to (b) of FIG. 9 and FIG. 11, a Tx beam determination process of the eNB will be described.

Each TCI state may be configured as one RS set. One of DL RS types including SSB, P-CSI RS, SP-CSI RS, A-CSI RS, and the like may be at least referred to for an ID of each DL RS for a purpose of spatial QCL (QCL Type D) in the RS set.

Initialization/update of the ID of the DL RS(s) in the RS set used for the purpose of the spatial QCL may be at least performed through explicit signaling.

Table 5 shows an example of TCI-State IE.

The TCI-State IE is associated with a quasi co-location (QCL) type corresponding to one or two DL reference signals (RSs).

TABLE 5

```
-- ASN1START
-- TAG-TCI-STATE-START
TCI-State ::=           SEQUENCE {
    tci-StateId             TCI-StateId,
    qcl-Type1               QCL-Info,
    qcl-Type2               QCL-Info
    ...
}
QCL-Info ::=            SEQUENCE {
    cell                    ServeCellIndex
    bwp-Id                  BWP-Id
    referenceSignal         CHOICE {
        csi-rs                  NZP-CSI-RS-ResourceId,
        ssb                     SSB-Index
    },
    qcl-Type                ENUMERATED {typeA, typeB, typeC, typeD},
    ...
}
-- TAG-TCI-STATE-STOP
-- ASN1STOP
```

FIG. 11 is a flowchart showing an example of a TX beam determination process of an eNB.

The UE receives, from the eNB, NZP CSI-RS resource set IE including higher layer parameter repetition through RRC signaling (S1110).

Here, the repetition parameter is configured to 'OFF' and associated with the Tx beam sweeping procedure of the eNB.

The UE receives a resource(s) in CSI-RS resource set configured as repetition 'OFF' through different Tx beams (DL spatial domain transmission filters) of the eNB (S1120).

The UE selects (or determines) a best beam (S1130), and reports to the eNB an ID for the selected beam and related quality information (e.g., L1-RSRP) (S1140).

In this case, reportQuantity of CSI report config may be configured as 'CRI+L1-RSRP'. In other words, when the CSI-RS is transmitted for the BM, the UE reports to the eNB the CRI and L1-RSRP therefor.

FIG. 12 illustrates an example of resource allocation in time and frequency domains associated with an operation of FIG. 9.

Referring to FIG. 12, when repetition 'ON' is configured in the CSI-RS resource set, a plurality of CSI-RS resources is repeatedly used via the same Tx beam. When repetition 'OFF' is configured in the CSI-RS resource set, different CSI-RS resources are transmitted via different Tx beams.

3. DL BM Associated Beam Indication

The UE may be RRC-configured with a list for a maximum of M candidate Transmission Configuration Indication (TCI) states at least for a purpose of Quasi Co-location (QCL) indication. Here, the M may be 64.

In Table 5, bwp-Id parameter represents DL BWP in which the RS is located, cell parameter represents a carrier in which the RS is located, and reference signal parameter represents a reference antenna port(s) which becomes a source of quasi co-location for a corresponding target antenna port(s) or a reference signaling including the same. The target antenna port(s) may be CSI-RS, PDCCH DMRS, or PDSCH DMRS. As an example, corresponding TCI state ID may be indicated for NZP CSI-RS resource configuration information in order to indicate QCL reference RS information for NZP CSI-RS. As another example, the TCI state ID may be indicated for each CORESET configuration in order to indicate QCL reference information for a PDCCH DMRS antenna port(s). As yet another example, the TCI state ID may be indicated through DCI in order to indicate QCL reference information for a PDSCH DMRS antenna port(s).

4. QCL (Quasi-Co Location)

The antenna port is defined so that a channel in which the symbol on the antenna port is transported may be inferred from a channel in which different symbols on the same antenna port are transported. When a property of a channel in which a symbol on one antenna port is transported may be inferred from a channel in which symbols on different antenna ports are transported, two antenna ports may have a quasi co-located or quasi co-location (QC/QCL) relationship.

Here, the channel property includes at least one of a delay spread, a Doppler spread, a frequency/Doppler shift, average received power, received timing/average delay, and a spatial Rx parameter. Here, the spatial Rx parameter means a spatial (receive) channel property parameter such as angle of arrival.

The UE may be configured as a list of up to M TCI-State configurations in higher layer parameter PDSCH-Config in order to decode the PDSCH according to detected PDCCH having an intended DCI for the corresponding UE and a given serving cell. The M depends on a UE capability.

Each TCI-State includes a parameter for configuring a quasi co-location relationship between one or two DL reference signals and a DM-RS port of the PDSCH.

The quasi co-location relationship is configured as higher layer parameter qcl-Type1 for a first DL RS and qcl-Type2 (when configured) for a second DL RS. Two DL RSs are not the same as each other in terms of QCL type regardless of whether two DL RS are DL RSs having the same reference or DL RSs having different references.

A quasi co-location type corresponding to each DL RS may be given by higher layer parameter qcl-Type of QCL-Info and may take one of the following values.
 'QCL-TypeA': {Doppler shift, Doppler spread, average delay, delay spread}
 'QCL-TypeB': {Doppler shift, Doppler spread}
 'QCL-TypeC': {Doppler shift, average delay}
 'QCL-TypeD': {Spatial Rx parameter}

For example, when a target antenna port is specific NZP CSI-RS, corresponding NZP CSI-RS antenna ports may be indicated/configured to be QCL with specific TRS from the viewpoint of QCL-Type A and specific SSB from the viewpoint of QCL-Type D. The UE that receives the indication/configuration may receive the corresponding NZP CSI-RS by using a Doppler delay value measured in QCL-TypeA TRS and apply an Rx beam used for receiving QCL-TypeD SSB to reception of the corresponding NZP CSI-RS.

The UE may receive an activation command by MAC CE signaling used for mapping up to eight TCI states to codepoint of DCI field 'Transmission Configuration Indication'.

UL BM Procedure

In the case of UL BM, beam reciprocity (or beam correspondence) between the Tx beam and the Rx beam may be established or not established according to UE implementation. If the reciprocity between the Tx beam and the Tx beam is established in both the eNB and the UE, a UL beam pair may be matched through a DL beam pair. However, when the reciprocity between the Tx beam and the Rx beam is not established even in any one of the eNB and the UE, a UL beam pair determination process is required apart form DL beam pair determination.

Further, even when the eNB and the UE maintain beam correspondence, the eNB may use a UL BM procedure in order to determine a DL Tx beam without requesting report of a preferred beam by the UE.

The UL BM may be performed through beamformed UL SRS transmission and whether to apply UL BM of the SRS resource set is configured by a (higher layer parameter) usage. When the usage is configured as 'BeamManagement (BM)', only one SRS resource may be transmitted to each of a plurality of SRS resource sets at a given time instant.

The UE may be configured with one or more Sounding Reference Symbol (SRS) resource sets configured by (higher layer parameter) SRS-ResourceSet (through higher layer signaling, RRC signaling, etc.). For each SRS resource set, the UE may be configured with K ($\geq 1$) SRS resources (higher later parameter SRS-resources). Here, K is a natural number and a maximum value of K is indicated by SRS_capability.

Similarly to the DL BM, a UL BM procedure may also be divided into Tx beam sweeping of the UE and Rx beam sweeping of the eNB.

FIG. 13 illustrates an example of an uplink beam management procedure using a Sounding Reference Signal (SRS).

(a) of FIG. 13 illustrates an Rx beam determination procedure of the eNB and (b) of FIG. 13 illustrates a Tx beam sweeping procedure of the UE.

FIG. 14 is a flowchart showing an example of an uplink beam management procedure using the SRS.

The UE receives, from the eNB, RRC signaling (e.g., SRS-Config IE) including a (higher layer parameter) usage parameter configured as 'beam management' (S1410).

Table 6 shows an example of SRS-Config Information Element (IE) and SRS-Config IE is used for an SRS transmission configuration. SRS-Config IE includes a list of SRS-Resources and a list of SRS-ResourceSets. Each SRS resource set means a set of SRS-resources.

The network may trigger transmission of the SRS resource set by using configured aperiodicSRS-Resource-Trigger (L1 DCI).

TABLE 6

```
-- ASN1START
-- TAG-MAC-CELL-GROUP-CONFIG-START
SRS-Config ::=                          SEQUENCE {
    srs-ResourceSetToReleaseList            SEQUENCE (SIZE(1..maxNrofSRS-
ResourceSets)) OF SRS-ResourceSetId         OPTIONAL,           -- Need N
    srs-ResourceSetToAddModList             SEQUENCE (SIZE(1..maxNrofSRS-
ResourceSets)) OF SRS-ResourceSet               OPTIONAL,           -- Need N
    srs-ResourceToReleaseList               SEQUENCE (SIZE(1..maxNrofSRS-
Resource)) OF SRS-ResourceId                    OPTIONAL,           -- Need N
    srs-ResourceToAddModList                SEQUENCE (SIZE(1..maxNrofSRS-
Resource)) OF SRS-Resource                      OPTIONAL,           -- Need N
    tpc-Accumulation                        ENUMERATED {disabled}
    ...
}
SRS-ResourceSet ::=                     SEQUENCE {
    srs-ResourceSetId                       SRS-ResurceSetId,
    srs-ResourceIdList                      SEQUENCE (SIZE(1..maxNrofSRS-
ResourcesPerSet)) OF SRS-ResourceId         OPTIONAL,           -- Cond Setup
    resourceType                            CHOICE {
        aperiodic                               SEQUENCE {
```

TABLE 6-continued

```
        aperiodicSRS-ResourceTrigger              INTEGER (1..maxNrofSRS-
TriggerStates-1),
        csi-RS                                    NZP-CSI-RS-ResourceId
        slotOffset                                INTEGER (1..32)
        ...
    },
    semi-persistent                       SEQUENCE {
        associatedCSI-RS                          NZP-CSI-RS-ResourceId
        ...
    },
    periodic                              SEQUENCE {
        associatedCSI-RS                          NZP-CSI-RS-ResourceId
        ...
    }
},
usage                                     ENUMERATED {beamManagement,
codebook, nonCodebook, antennaSwitching},
alpha                                     Alpha
p0                                        INTEGER (-202..24)
pathlossReferenceRS                       CHOICE {
    ssb-Index                                     SSB-Index,
    csi-RX-Index                                  NZP-CSI-RS-ResouceId
SRS-SpatialRelationInfo ::=               SEQUENCE {
    servingCellId                                 ServCellIndex
    referenceSignal                               CHOICE {
        ssb-Index                                 SSB-Index,
        csi-RS-Index                              NZP-CSI-RS-ResourceId,
        srs                                       SEQUENCE {
            resourceId                                    SRS-ResourceId,
            uplinkBWP                                     BWP-Id
        }
    }
}
}
SRS-ResourceId ::=                        INTEGER (0..maxNrofSRS-Resouces-1)
```

In Table 6, usage represents a higher layer parameter indicating whether the SRS resource set is used for the beam management or whether the SRS resource set is used for codebook based or non-codebook based transmission. The usage parameter corresponds to L1 parameter 'SRS-SetUse'. 'spatialRelationInfo' is a parameter representing a configuration of a spatial relation between a reference RS and a target SRS. Here, the reference RS may become SSB, CSI-RS, or SRS corresponding to L1 parameter 'SRS-SpatialRelationInfo'. The usage is configured for each SRS resource set.

The UE determines a Tx beam for an SRS resource to be transmitted based on SRS-SpatialRelation Info included in the SRS-Config IE (S1420). Here, SRS-SpatialRelation Info is configured for each SRS resource and represents a beam which is the same as the beam used in the SSB, the CSI-RS, or the SRS is to be applied for each SRS resource. Further, SRS-SpatialRelationInfo may be configured or not configured in each SRS resource.

If SRS-SpatialRelationInfo is configured in the SRS resource, SRS-SpatialRelationInfo is transmitted by applying the beam which is the same as the beam used in the SSB, the CSI-RS, or the SRS. However, if SRS-SpatialRelationInfo is not configured in the SRS resource, the UE arbitrarily determines the Tx beam and transmits the SRS through the determined Tx beam (S1430).

More specifically, for P-SRS in which 'SRS-ResourceConfigType' is configured as 'periodic':
i) When SRS-SpatialRelationInfo is configured as 'SSB/PBCH', the UE transmits the corresponding SRS resource by applying a spatial domain transmission filter which is the same as a spatial domain Rx filter used for receiving the SSB/PBCH (or generated from the corresponding filter); or ii) When SRS-SpatialRelationInfo is configured as 'CSI-RS', the UE transmits the SRS resource by applying the same spatial domain transmission filter used for receiving periodic CSI-RS or SP CSI-RS; or iii) When SRS-SpatialRelationInfo is configured as 'SRS', the UE transmits the SRS resource by applying the same spatial domain transmission filter used for transmitting the periodic CSI-RS.

Even when 'SRS-ResourceConfigType' is configured as 'SP-SRS' or 'AP-SRS', beam determination and transmission operations may be applied similarly thereto.

Additionally, the UE may receive or not receive a feedback for the SRS from the eNB like three following cases (S1440).

i) When Spatial_Relation_Info is configured for all SRS resources in the SRS resource set, the UE transmits the SRS with the beam indicated by the eNB. For example, when all Spatial_Relation_Info indicates the same SSB, CRI, or SRI, the UE repeatedly transmits the SRS with the same beam. This case as a usage of selecting the Rx beam by the eNB corresponds to (a) of FIG. 13.

ii) Spatial_Relation_Info may not be configured for all SRS resources in the SRS resource set. In this case, the UE may transmit the SRS while arbitrarily changing the SRS beam. In other words, this case as a usage of selecting the Tx beam by the UE corresponds to (b) of FIG. 13.

iii) Spatial_Relation_Info may be configured for some SRS resources in the SRS resource set. In this case, the SRS may be transmitted with the beam configured for the configured SRS resource and the UE may arbitrarily transmit the SRS by applying the Tx beam to an SRS resource in which Spatial_Relation_Info is not configured.

CSI Related Operation

In a New Radio (NR) system, a channel state information-reference signal (CSI-RS) is used for time and/or frequency tracking, CSI computation, layer 1 (L1)-reference signal received power (RSRP) computation, and mobility. Hear, the CSI computation is related to CSI acquisition and L1-RSRP computation is related to beam management (BM).

Channel state information (CSI) collectively refers to information that may indicate the quality of a radio channel (or referred to as a link) formed between the UE and the antenna port.

FIG. 15 is a flowchart showing an example of a CSI related procedure.

Referring to the FIG. 15, in order to perform one of usages of the CSI-RS, a terminal (e.g., user equipment (UE)) receives, from a base station (e.g., general Node B or gNB), configuration information related to the CSI through radio resource control (RRC) signaling (S1510).

The configuration information related to the CSI may include at least one of CSI-interference management (IM) resource related information, CSI measurement configuration related information, CSI resource configuration related information, CSI-RS resource related information, or CSI report configuration related information.

The CSI-IM resource related information may include CSI-IM resource information, CSI-IM resource set information, and the like. The CSI-IM resource set is identified by a CSI-IM resource set identifier (ID) and one resource set includes at least one CSI-IM resource. Each CSI-IM resource is identified by a CSI-IM resource ID.

The CSI resource configuration related information may be expressed as CSI-ResourceConfig IE. The CSI resource configuration related information defines a group including at least one of a non zero power (NZP) CSI-RS resource set, a CSI-IM resource set, or a CSI-SSB resource set. In other words, the CSI resource configuration related information may include a CSI-RS resource set list and the CSI-RS resource set list may include at least one of a NZP CSI-RS resource set list, a CSI-IM resource set list, or a CSI-SSB resource set list. The CSI-RS resource set is identified by a CSI-RS resource set ID and one resource set includes at least one CSI-RS resource. Each CSI-RS resource is identified by a CSI-RS resource ID.

Table 7 shows an example of NZP CSI-RS resource set IE. As shown in Table 7, parameters (e.g., a BM related 'repetition' parameter and a tracking related 'trs-Info' parameter) representing the usage may be configured for each NZP CSI-RS resource set.

TABLE 7

```
-- ASN1START
-- TAG-NZP-CSI-RS-RESOURCESET-START
NZP-CSI-RS-ResourceSet ::=    SEQUENCE {
    nzp-CSI-ResourceSetId         NZP-CSI-RS-ResourceSetId,
    nzp-CSI-RS-Resources          SEQUENCE (SIZE (1..maxNrofNZP-CSI-RS-
ResourcePerSet)) OF NZP-CSI-RS-ResourceId,
    repetition                    ENUMERATED { on, off }
    aperiodicTriggeringOffset     INTEGER(0..4)
    trs-Info                      ENUMERATED {true}
    ...
}
-- TAG-NZP-CSI-RS-RESOURCESET-STOP
-- ASN1STOP
```

In addition, the repetition parameter corresponding to the higher layer parameter corresponds to 'CSI-RS-ResourceRep' of L1 parameter.

The CSI report configuration related information includes a reportConfigType parameter representing a time domain behavior and a reportQuantity parameter representing a CSI related quantity for reporting. The time domain behavior may be periodic, aperiodic, or semi-persistent.

The CSI report configuration related information may be expressed as CSI-ReportConfig IE and Table 8 below shows an example of CSI-ReportConfig IE.

TABLE 8

```
-- ASN1START
-- TAG-CSI-RESOURCECONFIG-START
CSI-ReportConfig ::=                  SEQUENCE {
    reportConfigId                       CSI-ReportConfigId,
    carrier                              ServCellIndex             OPTIONAL, -
- Need S
    resourcesForChannelMeasurement       CSI-ResourceConfigId,
    csi-IM-ResourcesForInterference      CSI-ResourceConfigId      OPTIONAL, -
- Need R
    nzp-CSI-RS-ResourcesForInterference  CSI-ResourceConfigId      OPTIONAL, -
- Need R
    reportConfigType                     CHOICE {
        periodic                             SEQUENCE {
            reportSlotConfig                     CSI-
ReportPeriodicityAndOffset,
            pucch-CSI-ResourceList               SEQUENCE (SIZE
```

TABLE 8-continued

```
(1..maxNrofBWPs)) OF PUCCH-CSI-Resource
        },
            semiPersistentOnPUCCH              SEQUENCE {
                reportSlotConfig                   CSI-
ReportPeriodicityAndOffset,
                pucch-CSI-ResourceList             SEQUENCE (SIZE
(1..maxNrofBWPs)) OF PUCCH-CSI-Resource
        },
            semiPersistentOnPUSCH              SEQUENCE {
                reportSlotConfig                   ENUMERATED {sl5, sl10, sl20,
sl140, sl80, sl160, sl320},
                reportSlotOffsetList               SEQUENCE (SIZE (1.. maxNrofUL-
Allocations)) OF INTEGER(0..32),
                p0alpha                            P0-PUSCH-AlphaSetId
            },
            aperiodic                          SEQUENCE {
                reportSlotOffsetList               SEQUENCE (SIZE (1..maxNrofUL-
Allocations)) OF INTEGER(0..32)
            }
        },
        reportQuantity                     CHOICE {
            none                               NULL,
            cri-RI-PMI-CQI                     NULL,
            cri-RI-i1                          NULL,
            cri-RI-i1-CQI                      SEQUENCE {
                pdsch-BundleSizeForCSI             ENUMERATED {n2, n4}
OPTIONAL
            },
            cri-RI-CQI                         NULL,
            cri-RSRP                           NULL,
            ssb-Inex-RSRP                      NULL,
            cri-RI-LI-PMI-CQI                  NULL
        },
```

The UE measures CSI based on configuration information related to the CSI (S1520). The CSI measurement may include (1) a CSI-RS reception process (S1521) and (2) a process of computing the CSI through the received CSI-RS (S1522). Detailed description will be described later.

For the CSI-RS, resource element (RE) mapping of the CSI-RS resource is configured in time and frequency domains by higher layer parameter CSI-RS-ResourceMapping.

Table 9 shows an example of CSI-RS-ResourceMapping IE.

In Table 9, a density (D) represents a density of the CSI-RS resource measured in RE/port/physical resource block (PRB) and nrofPorts represents the number of antenna ports.

Further, the UE reports the measured CSI to the eNB (S1530).

Here, in the case where a quantity of CSI-ReportConfig of Table 9 is configured to 'none (or No report)', the UE may skip the report.

TABLE 9

```
-- ASN1START
-- TAG-CSI-RS-RESOURCEMAPPING-START
    CSI-RS-ResourceMapping ::=       SEQUENCE {
        frequencyDomainAllocation        CHOICE {
            row1                             BIT STRING (SIZE (4)),
            row2                             BIT STRING (SIZE (12)),
            row4                             BIT STRING (SIZE (3)),
            other                            BIT STRING (SIZE (6))
        },
        nrofPorts                        ENUMERATED {p1,p2,p4,p8,p12,p16,p24,p32},
        firstOFDMSymbolInTimeDomain      INTEGER (0..13),
        firstOFDMSymbolInTimeDomain2     INTEGER (2..12)
        cdm-Type                         ENUMERATED {noCDM, fd-CDM2, cdm4-FD2-TD2, cdm8-
FD2-TD4},
        density                          CHOICE {
            dot5                             ENUMERATED {evenPRBs, oddPRBs},
            one                              NULL,
            three                            NULL,
            spare                            NULL
        },
        freqBand                         CSI-FrequencyOccupation,
        ...
    }
```

However, even in the case where the quantity is configured to 'none (or No report)', the UE may report the measured CSI to the eNB.

The case where the quantity is configured to 'none (or No report)' is a case of triggering aperiodic TRS or a case where repetition is configured.

Here, only in a case where the repetition is configured to 'ON', the UE may be defined to skip the report.

CSI Reporting Configuration

The UE may assume the following dependency between CSI parameters, and calculate the CSI parameters. For example, LI may be calculated conditioned on reported CQI, PMI, RI, and CRI. For example, the CQI may be calculated conditioned on the reported PMI, RI, and CRI. For example, the PMI may be calculated conditioned on the reported RI and CRI. For example, the RI may be calculated conditioned on the reported CRI.

Reporting configuration for the CSI may be aperiodic (using PUSCH), periodic (using PUCCH), or semi-persistent (using PUCCH and DCI activated PUSCH). The CSI-RS resources may be periodic, semi-persistent, or aperiodic. Table 10 shows how a supported combination of CSI reporting configuration and CSI-RS resource configuration and CSI reporting are triggered by each CSI-RS resource configuration. The periodic CSI-RS may be configured by a higher layer. The semi-persistent CSI-RS may be activated and deactivated. Trigger/activation may be configured for the aperiodic CSI-RS.

TABLE 3

| $\mu$ | $N_{symb}^{slot}$ | $N_{slot}^{subframe, \mu}$ | $N_{slot}^{subframe, \mu}$ |
|---|---|---|---|
| 2 | 12 | 40 | 4 |

When the UE is configured by higher layer parameter NZP-CSI-RS-ResourceSet and higher layer parameter repetition is configured as 'off', the UE may determine the CRI from among supported sets of CRI values, and report the number in each CRI reporting. When the higher layer parameter repetition is configured as 'on', the CRI may not be reported. The CRI reporting may not be reported when higher layer parameter codebookType is configured as 'typeII' or 'typeII-PortSelection'.

For the CSI reporting on the periodic or semi-persistent PUCCH, a periodicity (measured in slots) may be configured by higher layer parameter reportSlotConfig.

For the CSI reporting on the semi-persistent or aperiodic PUSCH, the allowed slot offsets may be configured by higher layer parameter reportSlotOffsetList. The offset may be selected from activating/triggering DCI.

For the CSI reporting, the UE may be configured through one higher layer signaling of two possible subband sizes. Here, a subband may be defined as $N_{PRB}^{SB}$ consecutive PRBs, and the total number of PRBs in the BWP may be determined according to Table 11.

TABLE 11

| Bandwidth part (PRBs) | Subband size (PRBs) |
|---|---|
| <24 | N/A |
| 24-72 | 4, 8 |
| 73-144 | 8, 16 |
| 145-275 | 16, 32 |

The reportFreqConfiguration included in the CSI-ReportConfig represents frequency granularity of the CSI reporting. CSI reporting setting configuration is a subset of the subbands of the BWP, and a CSI reporting band may be defined, and the reportFreqConfiguration may indicate the following:

The csi-ReportingBand represents a continuous or non-contiguous subset of the subbands in the BWP in which the CSI is to be reported. The UE does not expect to be configured as the CSI reporting band including subbands in which a reference signal and interference for a channel do not exist.

For wideband CQI or subband CQI reporting, it may be configured by a higher layer parameter cqi-FormatIndicator. When the wideband CQI reporting is configured, the wideband CQI may be reported for each codeword for the entire CSI reporting band. When the subband CQI reporting is configured, one CQI for each codeword may be reported for each subband in the CSI reporting band.

For wideband PMI or subband PMI reporting, it may be configured by a higher layer parameter pmi-FormatIndicator. When the wideband PMI reporting is configured, the wideband PMI may be reported for the entire CSI reporting band. When the subband PMI reporting is configured, except for 2 antenna ports, a single wideband indication (i1) may be reported for the entire CSI reporting band, and one subband indication (i2) may be reported for each subband of the CSI reporting band. When subband PMIS are configured as the 2 antenna ports, the PMI may be reported for each subband of the CSI reporting band.

CSI Reporting Setting may be said to have wideband frequency-granularity in the following cases.

When reportQuantity is configured as 'cri-RI-PMI-CQI' or 'cri-RI-LI-PMI-CQI', cqi-FormatIndicator indicates single CQI reporting, and pmi-FormatIndicator indicates single PMI reporting, or When reportQuantity is configured as 'cri-RI-i1', or When reportQuantity is configured as 'cri-RI-CQI' or 'cri-RI-i1-CQI', and cqi-FormatIndicator indicates single CQI reporting, or When reportQuantity is configured as 'cri-RSRP' or 'ssb-Index-RSRP'

Except for the above case, it may be said that the CSI Reporting Setting has subband frequency-granularity.

CSI Measurement

The NR system supports more flexible and dynamic CSI measurement and reporting. The CSI measurement may include a procedure of acquiring the CSI by receiving the CSI-RS and computing the received CSI-RS.

As time domain behaviors of the CSI measurement and reporting, aperiodic/semi-persistent/periodic channel measurement (CM) and interference measurement (IM) are supported. A 4 port NZP CSI-RS RE pattern is used for configuring the CSI-IM.

CSI-IM based IMR of the NR has a similar design to the CSI-IM of the LTE and is configured independently of ZP CSI-RS resources for PDSCH rate matching. In addition, in ZP CSI-RS based IMR, each port emulates an interference layer having (a preferable channel and) precoded NZP CSI-RS. This is for intra-cell interference measurement with respect to a multi-user case and primarily targets MU interference.

The eNB transmits the precoded NZP CSI-RS to the UE on each port of the configured NZP CSI-RS based IMR.

The UE assumes a channel/interference layer for each port and measures interference.

In respect to the channel, when there is no PMI and RI feedback, multiple resources are configured in a set and the base station or the network indicates a subset of NZP CSI-RS resources through the DCI with respect to channel/interference measurement.

Resource setting and resource setting configuration will be described in more detail.

Resource Setting

Each CSI resource setting 'CSI-ResourceConfig' includes a configuration for S≥1 CSI resource set (given by higher layer parameter csi-RS-ResourceSetList). Here, the CSI resource setting corresponds to the CSI-RS-resourcesetlist. Here, S represents the number of configured CSI-RS resource sets. Here, the configuration for S≥1 CSI resource set includes each CSI resource set including CSI-RS resources (constituted by NZP CSI-RS or CSI IM) and an SS/PBCH block (SSB) resource used for L1-RSRP computation.

Each CSI resource setting is positioned in a DL BWP (bandwidth part) identified by a higher layer parameter bwp-id. In addition, all CSI resource settings linked to CSI reporting setting have the same DL BWP.

A time domain behavior of the CSI-RS resource within the CSI resource setting included in CSI-ResourceConfig IE is indicated by higher layer parameter resourceType and may be configured to be aperiodic, periodic, or semi-persistent. The number S of configured CSI-RS resource sets is limited to '1' with respect to periodic and semi-persistent CSI resource settings. Periodicity and slot offset which are configured are given in numerology of associated DL BWP as given by bwp-id with respect to the periodic and semi-persistent CSI resource settings.

When the UE is configured as multiple CSI-ResourceConfigs including the same NZP CSI-RS resource ID, the same time domain behavior is configured with respect to CSI-ResourceConfig.

When the UE is configured as multiple CSI-ResourceConfigs including the same CSI-IM resource ID, the same time domain behavior is configured with respect to CSI-ResourceConfig.

Next, one or more CSI resource settings for channel measurement (CM) and interference measurement (IM) are configured through higher layer signaling.

CSI-IM resource for interference measurement.

NZP CSI-RS resource for interference measurement.

NZP CSI-RS resource for channel measurement.

That is, channel measurement resource (CMR) may be NZP CSI-RS and interference measurement resource (IMR) may be NZP CSI-RS for CSI-IM and IM.

Here, CSI-IM (or ZP CSI-RS for IM) is primarily used for inter-cell interference measurement.

In addition, NZP CSI-RS for IM is primarily used for intra-cell interference measurement from multi-users.

The UE may assume CSI-RS resource(s) for channel measurement and CSI-IM/NZP CSI-RS resource(s) for interference measurement configured for one CSI reporting are 'QCL-TypeD' for each resource.

Resource Setting Configuration

As described, the resource setting may mean a resource set list.

In each trigger state configured by using higher layer parameter CSI-AperiodicTriggerState with respect to aperiodic CSI, each CSI-ReportConfig is associated with one or multiple CSI-ReportConfigs linked to the periodic, semi-persistent, or aperiodic resource setting.

One reporting setting may be connected with a maximum of three resource settings.

When one resource setting is configured, the resource setting (given by higher layer parameter resourcesForChannelMeasurement) is used for channel measurement for L1-RSRP computation.

When two resource settings are configured, a first resource setting (given by higher layer parameter resourcesForChannelMeasurement) is used for channel measurement and a second resource setting (given by csi-IM-ResourcesForInterference or nzp-CSI-RS-ResourcesForInterference) is used for interference measurement performed on CSI-IM or NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement, and a third resource setting (given by nzp-CSI-RS-ResourcesForInterference) is for NZP CSI-RS based interference measurement.

Each CSI-ReportConfig is linked to periodic or semi-persistent resource setting with respect to semi-persistent or periodic CSI.

When one resource setting (given by resourcesForChannelMeasurement) is configured, the resource setting is used for channel measurement for L1-RSRP computation.

When two resource settings are configured, a first resource setting (given by resourcesForChannelMeasurement) is used for channel measurement and a second resource setting (given by higher layer parameter csi-IM-ResourcesForInterference) is used for interference measurement performed on CSI-IM.

CSI Computation

When interference measurement is performed on CSI-IM, each CSI-RS resource for channel measurement is associated with the CSI-IM resource for each resource by an order of CSI-RS resources and CSI-IM resources within a corresponding resource set. The number of CSI-RS resources for channel measurement is equal to the number of CSI-IM resources.

In addition, when the interference measurement is performed in the NZP CSI-RS, the UE does not expect to be configured as one or more NZP CSI-RS resources in the associated resource set within the resource setting for channel measurement.

A UE in which Higher layer parameter nzp-CSI-RS-ResourcesForInterference is configured does not expect that 18 or more NZP CSI-RS ports will be configured in the NZP CSI-RS resource set.

For CSI measurement, the UE assumes the followings.

Each NZP CSI-RS port configured for interference measurement corresponds to an interference transport layer.

In all interference transport layers of the NZP CSI-RS port for interference measurement, an energy per resource element (EPRE) ratio is considered.

Different interference signals on RE(s) of the NZP CSI-RS resource for channel measurement, the NZP CSI-RS resource for interference measurement, or CSI-IM resource for interference measurement.

CSI Reporting

For CSI reporting, time and frequency resources which may be used by the UE are controlled by the eNB.

The channel state information (CSI) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), and L1-RSRP.

For the CQI, PMI, CRI, SSBRI, LI, RI, and L1-RSRP, the UE is configured by a higher layer as N≥1 CSI-ReportConfig reporting setting, M≥1 CSI-ResourceConfig resource setting, and a list (provided by aperiodicTriggerStateList and semiPersistentOnPUSCH) of one or two trigger states. In the aperiodicTriggerStateList, each trigger state includes the channel and an associated CSI-ReportConfigs list optionally indicating resource set IDs for interference. In the semiPersistentOnPUSCH-TriggerStateList, each trigger state includes one associated CSI-ReportConfig.

In addition, the time domain behavior of CSI reporting supports periodic, semi-persistent, and aperiodic.
  i) The periodic CSI reporting is performed on short PUCCH and long PUCCH. The periodicity and slot offset of the periodic CSI reporting may be configured through RRC and refer to the CSI-ReportConfig IE.
  ii) SP CSI reporting is performed on short PUCCH, long PUCCH, or PUSCH.

In the case of SP CSI on the short/long PUCCH, the periodicity and the slot offset are configured as the RRC and the CSI reporting to separate MAC CE is activated/deactivated.

In the case of the SP CSI on the PUSCH, the periodicity of the SP CSI reporting is configured through the RRC, but the slot offset is not configured through the RRC and the SP CSI reporting is activated/deactivated by DCI (format 0_1). Separated RNTI (SP-CSI C-RNTI) is used with respect to the SP CSI reporting on the PUSCH.

An initial CSI reporting timing follows a PUSCH time domain allocation value indicated in the DCI and a subsequent CSI reporting timing follows a periodicity configured through the RRC.

DCI format 0_1 may include a CSI request field and may activate/deactivate a specific configured SP-CSI trigger state. In addition, the SP CSI reporting has the same or similar activation/deactivation as a mechanism having data transmission on SPS PUSCH.
  iii) The aperiodic CSI reporting is performed on the PUSCH and is triggered by the DCI. In this case, information related to triggering aperiodic CSI reporting is transmitted/indicated/configured via MAC-CE.

In the case of AP CSI having AP CSI-RS, an AP CSI-RS timing is configured by the RRC. Here, a timing for the AP CSI reporting is dynamically controlled by the DCI.

The NR does not adopt a scheme (for example, transmitting RI, WB PMI/CQI, and SB PMI/CQI in order) of dividing and reporting the CSI in multiple reporting instances applied to PUCCH based CSI reporting in the LTE. Instead, the NR restricts specific CSI reporting not to be configured in the short/long PUCCH and a CSI omission rule is defined. In addition, in relation with the AP CSI reporting timing, a PUSCH symbol/slot location is dynamically indicated by the DCI. In addition, candidate slot offsets are configured by the RRC. For the CSI reporting, slot offset (Y) is configured for each reporting setting. For UL-SCH, slot offset K2 is configured separately.

Two CSI latency classes (low latency class and high latency class) are defined in terms of CSI computation complexity. The low latency CSI is a WB CSI that includes up to 4 ports Type-I codebook or up to 4-ports non-PMI feedback CSI. The high latency CSI refers to CSI other than the low latency CSI. For a normal UE, (Z, Z') is defined in a unit of OFDM symbols. Hear, Z represents a minimum CSI processing time from the reception of the aperiodic CSI triggering DCI to the execution of the CSI reporting. In addition, Z' represents a minimum CSI processing time from the reception of the CSI-RS for channel/interference to the execution of the CSI reporting.

Additionally, the UE reports the number of CSIs which may be simultaneously calculated.

On the other hand, a coordinated multi point (CoMP) technique refers to a method of effectively controlling interference by cooperatively transmitting the UE, and by exchanging (e.g. using an X2 interface) or utilizing channel information (e.g. RI/CQI/PMI/LI, etc.) fed back by multiple base stations from the UE with each other. According to the CoMP operation method, it can be classified into joint transmission (JT), coordinated scheduling (CS), coordinated beamforming (CB), dynamic point selection (DPS), dynamic point blacking (DPB), and the like.

When reporting channel state information (CSI) for a downlink (DL) channel to the base station, the user equipment (UE) may report (feedback) it including channel direction information and channel quality information. For example, the UE may select the rank indicator (RI) and the precoding matrix indicator (PMI) from a predetermined codebook and report it to the base station as the channel direction information. In addition, in the case of receiving data using the selected RI and PMI, channel quality indicator (CQI) of an achievable channel may be reported as the channel quality information.

In a new RAT (NR) system, a codebook of high resolution may be supported, which is referred to as a type2 codebook. In addition, since several DFT beam vectors are linearly combined (LC) to indicate the channel direction, this is also referred to as a linear combination (LC) codebook (hereinafter an LC codebook).

As the resolution of the codebook and channel quality information (e.g. CQI) increases, more accurate feedback on the channel state may be possible, but as the size of the uplink payload increases, there may be a problem in that the uplink resources are heavily used. To solve this problem, it may be considered a method of transmitting channel quality information (e.g. CQI) having a small payload size periodically or semi-persistently, but transmitting the channel direction information (e.g. PMI/RI) having a large payload size aperiodically. In addition, in reporting periodic or semi-persistent channel state information, the UE may consider a method of feeding back whether or not it is necessary to additionally update the channel direction information (e.g. PMI/RI) in addition to the channel quality information (e.g. CQI). Accordingly, the base station may determine whether to trigger reporting of the channel direction information (e.g. PMI/RI).

Hereinafter in the present disclosure, methods of transmitting and receiving the channel state information based on an LC codebook as an example of a high resolution codebook will be described. However, this is only for convenience of description and does not limit the scope of the present disclosure. Therefore, it can be extended and applied even when transmitting and receiving the channel state information based on an arbitrary high-resolution codebook (i.e. CSI capable of accurate channel direction and quality expression using a large number of payloads) in addition to the LC codebook.

In addition, in the present disclosure, CSI feedback may be classified according to the CSI parameters (e.g. PMI, RI, CQI, etc.) included in the CSI reported to the base station. Specifically, CSI feedback including the channel direction information (e.g. PMI/RI) is referred to as CSI1, and CSI feedback that does not include the channel direction information (e.g. PMI/RI) is referred to as CSI2. However, referring to the CSI1 and CSI2 is for convenience of description only, and does not limit the technical scope of the present disclosure.

<Method 1>

FIG. 16 shows an example in which periodic or semi-persistent CSI feedback and aperiodic CSI feedback are performed in a time slot.

Specifically, in FIG. 16, slots 0/35 represent the aperiodic CSI feedback based on a trigger of the base station, and slots 10/20/30/40/50 represent the periodic or semi-persistent CSI feedback. Hereinafter, it is assumed that CSI reporting is performed based on FIG. 16 and described. However, this is only for convenience of description and does not limit the technical scope of the present disclosure. Therefore, it is obvious that the time slot in which the CSI reporting is performed may be changed.

Considering the use of uplink resources, it may be considered a method of transmitting channel state information having a large payload size aperiodically and transmitting channel state information having a small payload size periodically or semi-persistently. In other words, it may be considered a method in which the CSI feedback including the channel direction information (e.g. PMI/RI), that is, CSI1 is transmitted aperiodically based on the trigger of the base station only when an update is required, and a method in which the CSI feedback that does not include the channel direction information (e.g. PMI/RI), that is, CSI2 is transmitted periodically or semi-persistently.

For example, when the base station triggers the CSI reporting as needed, the UE may report RI/PMI/CQI through the aperiodic CSI feedback (e.g. CSI1). At this time, since the payload size of the CSI is large, it may be desirable to transmit through a physical uplink shared channel (PUSCH). In addition, the UE may report the CQI through the periodic or semi-persistent CSI feedback (e.g. CSI2).

As a specific example, the UE may transmit achievable channel quality information (e.g. CQI) to the base station through the periodic or semi-persistent CSI (e.g. CSI2) when data is received using the PMI/RI of the latest reported aperiodic CSI feedback (e.g. CSI1). In addition, the UE may transmit achievable channel quality information (e.g. CQIopt) to the base station when the PMI/RI is updated based on the latest measured channel, and data is received using the updated PMI/RI. That is, the achievable CQI when data is received may be calculated using the PMI/RI at the time point (slot) at which the channel quality information is measured (calculated). (At this time, the UE may not report the updated PMI/RI at the time (slot) of measuring the channel quality information to the base station.)

Hereinafter, for convenience of description, when the UE receives data using the latest reported PMI/RI, achievable channel quality information is indicated by the CQI, and when the UE updates the PMI/RI based on the latest measured channel at the time of CSI measurement, and receives data using this, achievable channel quality information is indicated by the CQIopt. However, the terms are only for convenience of description and do not limit the scope of the present disclosure.

Since the periodic or semi-persistent CSI feedback (e.g. CSI2) in which the channel quality information is transmitted may be transmitted through a resource available among PUSCH or physical uplink control channel (PUCCH) because the payload size is small. Alternatively, it may be limited to PUCCH and may be transmitted only through PUCCH.

The base station compares the CQI received from the UE and the CQIopt, and may request the aperiodic CSI feedback (e.g. CSI1) from the UE only when it is determined that the difference is out of a specific value. That is, when a difference between the CQI and the CQIopt exceeds the specific value, the aperiodic CSI feedback may be triggered.

For example, referring to FIG. 16, it is assumed that CSI feedback including the PMI/RI is performed based on the trigger of the base station in slot 0. When calculating the CQI in slot 10/20/30 corresponding to the periodic or semi-persistent CSI feedback, the UE may calculate the CQI based on the PMI/RI reported in slot 0, and when calculating the CQIopt in slot 10/20/30, the UE may calculate the CQIopt based on the updated PMI/RI in the corresponding slot.

The UE may periodically or semi-persistently transmit the calculated CQI and CQIopt to the base station. For example, it is assumed that the CQIs calculated in slots 10/20/30 are 10, 10, and 10, respectively, and CQIopt is 11, 12, and 15. The UE may transmit CQI=10, CQIopt=11 in slot 10, CQI=10, CQIopt=12 in slot 20, CQI=10 and CQIopt=15 in slot 30 to the base station, respectively.

The base station may determine whether it is necessary to update the channel direction information (e.g. PMI/RI) based on the received CQI and CQIopt, and transmit a signal for triggering aperiodic CSI feedback (e.g. CSI1) to the UE. In other words, the base station may determine whether the difference between the CQI and the CQIopt is large or small, and may request the feedback of the CSI1 from the UE only when it is determined that the difference is large.

For example, the base station receiving CQI=10 and CQIopt=15 in slot 30 may determine that the difference between the CQI and CQIopt is out of a specific value (or a certain range), and may determine that the RI/PMI received in slot 0 has outdated. As a result, the base station may request the feedback of the CSI1 from the UE again in slot 35 (or before slot 35), and in response to this, the base station may receive the CSI reporting including the latest RI/PMI from the UE. When the UE calculates the CQI in slot 40/50, the UE may calculate the CQI based on the RI/PMI transmitted in slot 35, which was recently fed back to the base station.

The terminal may recognize a change in a channel (or beam) state by calculating the above-described CQI and CQIopt. The base station may clearly determine whether the PMI/RI needs to be updated and when to update by receiving the above-described CQI and CQIopt. In addition, there is an effect of reducing unnecessary resource use by requesting an update from the UE only when an update is required (e.g. trigger signal transmission).

As another example, instead of transmitting CQIopt, a difference value between CQI and CQIopt (e.g. CQIdiff) may be transmitted, thereby further reducing a payload size required for CSI feedback. CQIdiff is only an exemplary expression for convenience of description, does not limit the scope of the present disclosure, and CQIdiff may correspond to CQIopt. As a specific example, it is assumed that the CQIs calculated in slots 10/20/30 are 10, 10, and 10, respectively, and CQIopt is 11, 12, and 15. The UE may transmit CQI=10 and CQIdiff=1 in slot 10, CQI=10 and CQIdiff=2 in slot 20, and CQI=10 and CQIdiff=5 in slot 30 to the base station, respectively. The base station may determine whether it is necessary to update the PMI/RI based on the received CQI and CQIdiff, and transmit a signal for triggering an aperiodic CSI reporting to the UE.

On the other hand, in the case of subband CSI reporting, the PMI, CQI, and CQIopt (including CQIdiff) may all be reported in subband units. However, when reporting the CQIopt (including CQIdiff) for all subbands, since the overhead for the uplink resource may increase, a method of reducing the overhead by using a flag may be considered.

For example, when the CSI reporting for 10 subbands is required, a 1-bit flag may be defined for each subband, and the UE may transmit a total 10-bit flag to the base station. In this case, by additionally reporting the CQIopt only to the subband having a flag of 1, overhead of uplink resources required to report the CQIopt may be reduced. As a specific example, when the 10-bit flag is 10000 00000, the CQIopt may be reported only for the first subband among 10 subbands. The same may be applied to the case of transmitting CQIdiff instead of CQIopt.

As another example, in the case of the subband CSI reporting, in order to reduce uplink overhead, the PMI and CQI are reported in subband units, but the CQIopt may always report a value for a wideband. That is, when reporting subband CSI through CSI2, the UE reports both wideband CQI and subband CQI to the base station, but the CQIopt may be configured to report only wideband CQIopt. Even when the CQIdiff is transmitted instead of the CQIopt, only the wideband CQIdiff may be reported in the same manner.

When the UE needs to report CSI2 before transmitting CSI1 (in a state in which CSI1 has never been transmitted), CQI and CQIopt may promise to send with a specific value (e.g. 0), or the UE may transmit an arbitrary value. The base station receiving this may ignore the information. Alternatively, when the UE needs to report CSI2 before transmitting CSI1 (in a state in which CSI1 has never been transmitted), since CSI2 is meaningless, the UE may not transmit CSI2 because it is regarded as an incorrect configuration.

<Method 2>

In the following, as in Method 1 described above, when the UE receives data using the latest aperiodically reported PMI/RI, the UE represents achievable channel quality information as CQI, the UE updates the PMI/RI based on the latest measured channel at a time of CSI measurement, when receiving data using this, the UE represents the achievable channel quality information as CQIopt. However, the terms are only for convenience of description and do not limit the scope of the present disclosure.

As in Method 1 described above, the user equipment (UE) may calculate CQI (e.g. first information) and CQIopt (e.g. second information) for channel quality. The UE may determine whether to transmit a flag and/or a flag value based on the CQI (e.g. first information) and the CQIopt (e.g. second information). Here, the flag may correspond to a 1-bit value indicating whether the difference between the CQI (e.g. first information) and the CQIopt (e.g. second information) exceeds a specific value. The specific value used to determine whether to transmit the flag and/or the flag value may be determined by the base station and indicated to the UE. Alternatively, the UE may determine the specific value and report it to the base station.

For example, the UE may transmit the flag together with the CQI through the periodic or semi-persistent CSI feedback (e.g. CSI2). That is, the UE may transmit the flag and the CQI instead of the CQIopt through the periodic or semi-persistent CSI feedback (e.g. CSI2). For example, when the difference between the CQI and the CQIopt is less than the specific value, the flag may not be transmitted or 'flag=0' may be transmitted. When the difference between the CQI and the CQIopt is greater than the specific value, the UE may transmit 'flag=1'. The base station that has received 'flag=1' from the UE may determine that the difference between the CQI and the CQIopt exceeds the specific value, and may request feedback of CSI1 from the UE in consideration of network conditions. Alternatively, when it is difficult to allocate uplink resources for CSI1 feedback, the feedback may not be requested.

As a specific example, it is assumed that the CQIs calculated in slots 10/20/30 are 10, 10, and 10, respectively, and the CQI opt is 11, 12, and 15. In addition, it is assumed that a specific value used to determine whether to transmit the flag and/or the flag value is configured as 4. Since the difference between the CQI and the CQIopt is 1 in slot 10 and the difference between the CQI and the CQIopt is 2 in slot 20, the UE may not transmit the flag because the difference between the CQI and the CQIopt is less than the specific value. Alternatively, a flag (e.g. 0) value indicating that the difference between the CQI and the CQIopt does not exceed the specific value may be transmitted. On the other hand, since the difference between the CQI and the CQIopt is 5 in slot 30, it exceeds the configured specific value. Accordingly, the UE may transmit 'flag=1' to the base station and inform that the difference between the CQI and the CQIopt in the corresponding slot exceeds the specific value. The base station receiving the 'flag=1' may determine that it is necessary to update the PMI/RI because the CQI and the CQIopt differ by more than the specific value. In addition, the base station may or may not request feedback of CSI1 from the UE in consideration of the network condition.

As another example, by extending the flag from 1 bit to n bits (n is a natural number), a method of informing the base station about the difference between the CQI and the CQIopt may be considered. That is, the difference value between the CQI and the CQIopt may be represented by using the flag. As an example, a difference value candidate between the CQI and the CQIopt may be configured as a set, and it may be reported in n bits to which set the difference value between the CQI and the CQIopt belongs. In the case of an n-bit flag, 2*n sets may be configured.

As a specific example, when n=2, four sets of the difference value candidates may be configured, and sets 1, 2, 3, 4 may be configured as {0, 1}, {2, 3}, {4, 5},{6, 7, 8, . . . }, respectively. In the above example, since the difference between the CQI and the CQIopt is 1 in slot 10, the difference between the CQI and the CQIopt is 2 in slot 20, and the difference between the CQI and the CQIopt is 5 in slot 30, the UE may transmit a flag '00'/a flag '01'/a flag '10' in a 2-bit signal to the base station, respectively. Through the above method, the base station can know how much the difference between the CQI and the CQIopt has occurred.

As another example, a plurality of specific values may be configured, and an n-bit flag may be fed back whether the difference between the CQI and the CQIopt is greater than or equal to a specific value among the plurality of specific values. In the case of the n-bit flag, 2n specific values may be configured. As a specific example, in the case of a 2-bit flag, since 4 specific values may be configured, it is assumed that 1, 2, 4, and 7 are configured as specific values. In slot 10, since the difference between the CQI and the CQIopt is 1, 'flag=00' may be transmitted, in slot 20, since the difference between the CQI and the CQIopt is 2, 'flag=01' may be transmitted, and in slot 30, since the difference between the CQI and the CQIopt is 5, 'flag=10' may be transmitted.

On the other hand, in the case of the subband CSI reporting, the PMI, CQI, CQIopt, and flag may all be reported in subband units. However, when the CSI parameters are reported for all subbands, since overhead for uplink resources may increase, a method of reducing the overhead may be considered.

For example, in the case of the subband CSI reporting, in order to reduce uplink overhead, the PMI and CQI are reported in subband units, but the CQIopt, flag may always report a value for a wideband. That is, when reporting subband CSI through CSI2, the UE may report both wideband CQI and subband CQI to the base station, but the CQIopt may be configured to report only wideband CQIopt. Even when transmitting the CQIdiff instead of the CQIopt, similarly, only the wideband CQIdiff may be reported. The flag is also calculated by comparing the wideband CQI and the wideband CQIopt, and one value for the wideband may be reported.

When the UE needs to report CSI2 before transmitting CSI1 (in the state that CSI1 has never been transmitted), CQI and CQIopt may be promised to be sent with a specific value (e.g. 0) or the UE may send a random value. The base station receiving this may ignore the information. Alternatively, when the UE needs to report CSI2 before transmitting CSI1 (in the state that CSI1 has never been transmitted), since the CSI2 is meaningless, the UE may not transmit the CSI2 because it is regarded as an incorrect configuration.

The above-described Method 1 and Method 2 may be applied to beam reporting (e.g. L1(layer 1)-RSRP) related to beam management as well as general CSI feedback (e.g. the above-described channel quality information, etc.)

For example, CRI and L1-RSRP corresponding to the CRI may be reported as CSI feedback (e.g. CSI1) that is reported aperiodically, only the L1-RSRP corresponding to the CRI reported in the aperiodic CSI feedback (e.g. CSI1) may be reported as CSI feedback (e.g. CSI2) reported periodically or semi-persistently, and the CRI may not be reported. In addition, when it is determined that the CRI needs to be changed, the UE may request a CSI1 report trigger from the base station by reporting a flag along with L1-RSRP to CSI2. In other words, when the UE transmits the flag=1 to the base station, it may mean requesting a report trigger of CSI1 because the CRI of CSI1 is outdated. The base station receiving the flag may trigger a CSI1 reporting or ignore the flag in consideration of network conditions.

FIG. 17 shows an example of an operation flowchart of a UE performing a CSI reporting to which a method and/or embodiment proposed in the present disclosure can be applied. FIG. 17 is merely for convenience of description and does not limit the scope of the present disclosure.

Referring to FIG. 17, it is assumed that the UE and/or a base station operate based on the methods and/or embodiments of the methods 1 and 2 described above (here, the UE/base station is only an example, and may be substituted with various devices as described in FIGS. 19 to 23 described later). Some of the steps described in FIG. 17 may be merged or omitted. In addition, in performing procedures described below, the CSI-related operation of FIG. 15 may be considered/applied.

The UE may receive CSI reporting-related configuration information from the base station (S1710). For example, a report for at least one of aperiodic CSI, periodic CSI, and semi-persistent CSI may be configured based on the CSI reporting-related configuration information. For example, the CSI reporting-related configuration information may include information on a reporting period and a reporting start (time and/or whether or not) for periodic or semi-persistent CSI feedback, and the like. For example, the CSI reporting-related configuration information may include resource information for CSI of aperiodic, periodic and/or semi-persistent reporting type.

For example, the operation that the UE (e.g. 100/200 in FIGS. 19 to 23) in step S1710 described above receives the CSI reporting-related configuration information from the base station (e.g. 100/200 in FIGS. 19 to 23) may be implemented by the apparatuses of FIGS. 19 to 23 to be described below. For example, referring to FIG. 20, one or more processors 102 may control one or more transceivers 106 and/or one or more memories 104 to receive the CSI reporting-related configuration information, and the one or more transceivers 106 may receive the CSI reporting-related configuration information from the base station.

The UE may perform CSI calculation. For example, in the case of the periodic or semi-persistent CSI feedback, the CSI may be calculated in consideration of a period configured from the base station. Specifically, the UE may calculate first information and second information on channel quality based on the CSI reporting-related configuration information (S1720). For example, the first information may be calculated by applying a precoding matrix indicator (PMI) included in latest aperiodically reported CSI, and the second information may be calculated by applying the PMI at a time of calculation of the second information. In other words, the first information may indicate achievable channel quality information when the UE receives data using the latest reported PMI/RI, and the second information may indicate achievable channel quality information when the UE updates the PMI/RI based on the latest measured channel at the time of CSI measurement and receives data using this. For example, the first information may be the above-mentioned CQI, and the second information may be the above-mentioned CQIopt. For example, the first information and the second information on the channel quality may be transmitted through the periodic or semi-persistent CSI.

For example, the operation that the UE (e.g. 100/200 in FIGS. 19 to 23) in step S1720 described above calculates the CSI (calculates the first information and the second information) may be implemented by the apparatuses of FIGS. 19 to 23 to be described below. For example, referring to FIG. 20, the one or more processors 102 may control the one or more memories 104 to calculate the first information and the second information (CSI) on the channel quality, and the one or more processors 102 may calculate the first information and the second information (CSI) on the channel quality.

The UE may determine at least one of whether to transmit a flag and a flag value based on the first information and the second information (S1730). For example, the first information may be the above-mentioned CQI, and the second information may be the above-mentioned CQIopt.

For example, when a difference between the first information and the second information is greater than or equal to a specific value, the UE may determine that the flag is transmitted, and when the difference is less than the specific value, the flag is not transmitted. The specific value may be configured by the base station.

For example, the flag value may be determined by comparing the difference value between the first information and the second information and the specific value. The specific value may be determined by the base station and indicated to the UE. Alternatively, the UE may determine the specific value and report it to the base station. As an example, the flag may correspond to a 1-bit value indicating whether the difference between the first information (e.g. CQI) and the second information (e.g. CQIopt) is greater than or equal to the specific value. When the difference between the first information and the second information is greater than or equal to the specific value, the UE may determine to transmit a flag=1, and when the difference is less than the specific value, the UE may determine to transmit a flag=0. As another example, a plurality of sets consisting of candidate values of the difference value between first information (e.g. CQI) and second information (e.g. CQIopt) may be configured. The plurality of sets may be predefined by the base station and/or the UE. The specific value may be included in the plurality of sets.

The flag may consist of n bits (n is 2 or more), and which set the difference value between the first information (e.g. CQI) and the second information (e.g. CQIopt) belongs, can be reported as an n-bit flag. In the case of the n-bit flag, 2*n sets may be configured. As another example, a plurality of the specific values are configured, and it is possible to feed back the n-bit flag indicating whether the difference value between the first information (e.g. CQI) and the second information (e.g. CQIopt) is greater than or equal to a specific value among the plurality of the specific values. In the case of the n-bit flag, 2n specific values may be configured.

For example, the operation that the UE (e.g. 100/200 in FIGS. 19 to 23) in the above-described step S1730 determines at least one of whether to transmit the flag and the flag value based on the first information and the second information may be implemented by the apparatus of FIGS. 19 to 23 to be described below. For example, referring to FIG. 20, the one or more processors 102 may control the one or more memories 104 to determine at least one of whether to transmit the flag and the flag value, and the one or more processors 102 may determine at least one of whether to transmit the flag and the flag value.

The UE may transmit (or report) the CSI to the base station based on the first information and the flag (S1740). For example, the CSI may correspond to the periodic CSI or semi-persistent CSI reporting. In other words, the UE may periodically or semi-persistently transmit the CSI to the base station. For example, the UE may transmit the CSI through PUSCH. Alternatively, when the payload size is small, the CSI may be transmitted through PUCCH.

For example, the CSI may be reported to the base station including the calculated first information and second information. For example, the difference between the first information and the second information (e.g. CQIdiff described above) and the first information may be reported to the base station. By transmitting the difference value between the first information and the second information, there is an effect of reducing the use of uplink resources than when transmitting the second information. For example, the CSI may not include PMI and RI having a large payload size. For example, the CSI may further include a signal requesting a trigger signal for aperiodic CSI reporting. The signal for requesting the trigger signal for the aperiodic CSI reporting may mean a signal that informs the base station that the previously reported PMI/RI needs to be updated.

As another example, the UE may report (or transmit) the CSI including the first information and the flag. The UE may transmit the flag based on the first information (e.g. CQI) and the second information (e.g. CQIopt). For example, when the difference between the first information and the second information is greater than or equal to the specific value, a flag=1 may be transmitted. When the difference between the first information and the second information is less than the specific value, a flag=0 may be transmitted or a flag may not be transmitted.

For example, when the CSI corresponds to a subband CSI reporting, the first information may be reported in subband units, and the second information may be reported in wideband units. Alternatively, the second information may be reported in subband units only for subbands when the difference between the first information and the second information is greater than or equal to the specific value. As an example, the specific value may be configured by the base station. In this case, the UE may further transmit information on the subband in which the second information is reported to the base station. For example, a subband through which the second information is transmitted may be displayed using a 1-bit flag allocated for each subband. For example, the flag may also be calculated based on the first information of the wide band and the second information of the wide band, and one value for the wide band may be reported.

For example, the operation that the UE (e.g. 100/200 in FIGS. 19 to 23) in the above-described step S1740 reports (or transmits) the CSI to the base station (e.g. 100/200 in FIGS. 19 to 23) may be implemented by the apparatus of FIGS. 19 to 23 to be described below. For example, referring to FIG. 20, the one or more processors 102 may control the one or more transceivers 106 and/or the one or more memories 104 to transmit the CSI, and the one or more transceivers 106 may transmit the CSI to the base station.

The UE may receive a report trigger signal for aperiodic CSI feedback from the base station (S1750). For example, the trigger signal may be transmitted from the base station based on the flag. As another example, the trigger signal may be transmitted from the base station based on the first information and the second information. For example, the trigger signal may be received when the difference between the first information and the second information is greater than or equal to a specific value. The specific value may be configured by the base station. Therefore, in some cases, step S1750 may be omitted. For example, the trigger signal may be received through DCI.

For example, the operation that the UE (e.g. 100/200 in FIGS. 19 to 23) in the above-described step S1750 receives the report trigger signal for the aperiodic CSI feedback from the base station (e.g. 100/200 in FIGS. 19 to 23) may be implemented by the apparatus of FIGS. 19 to 23 to be described below. For example, referring to FIG. 20, the one or more processors 102 may control the one or more transceivers 106 and/or the one or more memories 104 to receive the report trigger signal for the aperiodic CSI feedback, and the one or more transceivers 106 may receive the report trigger signal for the aperiodic CSI feedback from the base station.

The UE may transmit the aperiodic CSI feedback to the base station in response to the trigger signal. The aperiodic CSI may include at least one of PMI and RI. In addition, the aperiodic CSI may be transmitted through the PUSCH. After transmitting the aperiodic CSI feedback, when calculating the periodic or semi-persistent CSI, the UE may calculate the CSI using the PMI/RI reported in the CSI feedback.

For example, the operation that the above-described UE (e.g. 100/200 in FIGS. 19 to 23) performs the aperiodic CSI reporting to the base station (e.g. 100/200 in FIGS. 19 to 23) may be implemented by the apparatus of FIGS. 19 to 23 to be described below. For example, referring to FIG. 20, the one or more processors 102 may control the one or more transceivers 106 and/or the one or more memories 104 to transmit the aperiodic CSI feedback, and the one or more transceivers 106 may transmit the aperiodic CSI feedback to the base station.

FIG. 18 shows an example of an operation flowchart of a base station receiving a CSI reporting to which a method and/or embodiment proposed in the present disclosure can be applied. FIG. 18 is merely for convenience of description and does not limit the scope of the present disclosure.

Referring to FIG. 18, it is assumed that the UE and/or a base station operate based on the methods and/or embodiments of the methods 1 and 2 described above (here, the UE/base station is only an example, and may be substituted with various devices as described in FIGS. 19 to 23 described later). Some of the steps described in FIG. 18 may be merged or omitted. In addition, in performing procedures described below, the CSI-related operation of FIG. 15 may be considered/applied.

The base station may transmit CSI-related configuration information to the UE (S1810). For example, a report for at least one of aperiodic CSI, periodic CSI, and semi-persistent CSI may be configured based on the CSI reporting-related configuration information. For example, the CSI reporting-related configuration information may include information on a reporting period and a reporting start (time and/or whether or not) for periodic or semi-persistent CSI feedback, and the like. For example, the CSI reporting-related configuration information may include resource information for CSI of aperiodic, periodic and/or semi-persistent reporting type, etc.

For example, the operation that the base station (e.g. 100/200 in FIGS. 19 to 23) in step S1810 described above transmits the CSI reporting-related configuration information to the UE (e.g. 100/200 in FIGS. 19 to 23) may be implemented by the apparatuses of FIGS. 19 to 23 to be described below. For example, referring to FIG. 20, one or more processors 202 may control one or more transceivers 206 and/or one or more memories 204 to transmit the CSI reporting-related configuration information, and the one or more transceivers 206 may transmit the CSI reporting-related configuration information to the UE.

The base station may receive CSI from the UE (S1820). The CSI may be periodically or semi-persistently received.

For example, the base station may receive first information (e.g. CQI) which is achievable channel quality information when the UE receives data using a precoding matrix indicator (PMI) included in the latest aperiodically reported CSI, and second information (e.g. CQIopt) which is achievable channel quality information when the UE updates the PMI/RI based on the latest measured channel at the time of CSI measurement and receives data using this. The first information and the second information may be periodically or semi-persistently received. In addition, the first information and the second information may not include the PMI and RI. As an example, the first information may be the above-mentioned CQI, and the second information may be the above-mentioned CQIopt.

For example, the base station may receive CSI including the first information (e.g. CQI) and a difference value (e.g. the above-described CQIdiff) between the first information (e.g. CQI) and the second information (e.g. CQIopt) from the UE.

For example, the base station may receive a signal requesting a trigger signal for an aperiodic CSI reporting from the UE.

For example, the base station may receive the first information and a flag from the UE. For example, the flag may correspond to a 1-bit value indicating whether the difference between the first information (e.g. CQI) and the second information (e.g. CQIopt) is greater than or equal to a specific value. When the difference between the first information and the second information is greater than or equal to a specific value, a flag=1 may be received, and when the difference is less than the specific value, a flag=0 may be received. The specific value may be determined by the base station and indicated to the UE. Alternatively, the UE may determine the specific value and report it to the base station. As another example, the flag may correspond to an n-bit value indicating to which range (set) the difference value between the first information (e.g. CQI) and the second information (e.g. CQIopt) belongs. The base station may receive an n-bit flag indicating which set the difference value between the first information (e.g. CQI) and the second information (e.g. CQIopt) belongs to among the difference value candidate sets. As another example, the base station may receive an n-bit flag indicating which of a plurality of specific values for the difference between the first information (e.g. CQI) and the second information (e.g. CQIopt) is greater than or equal to a specific value.

As another example, when the CSI corresponds to a subband CSI reporting, the first information may be reported in subband units, and the second information may be reported in wideband units. Alternatively, the second information may be reported in subband units only for subbands when the difference between the first information and the second information is greater than or equal to the specific value. In this case, the base station may further receive information on the subband in which the second information is reported from the UE. For example, a subband through which the second information is transmitted may be displayed using a 1-bit flag allocated for each subband.

For example, the operation that the base station (e.g. 100/200 in FIGS. 19 to 23) in step S1820 described above receives the CSI from the UE (e.g. 100/200 in FIGS. 19 to 23) may be implemented by the apparatuses of FIGS. 19 to 23 to be described below. For example, referring to FIG. 20, the one or more processors 202 may control the one or more transceivers 206 and/or the one or more memories 204 to receive the CSI, and the one or more transceivers 206 may receive the CSI from the UE.

The base station may transmit a signal for triggering aperiodic CSI feedback to the UE based on the received CSI (S1830). For example, the trigger signal may be transmitted from the base station based on the flag. As another example, the trigger signal may be transmitted based on the first information and the second information. For example, the trigger signal may be transmitted when the difference between the first information and the second information is greater than or equal to a specific value. The specific value may be configured (defined) by the base station. The signal for triggering the CSI feedback may be transmitted through DCI.

For example, the operation that the base station (e.g. 100/200 in FIGS. 19 to 23) in step S1830 described above transmits a signal for triggering aperiodic CSI feedback from the UE (e.g. 100/200 in FIGS. 19 to 23) may be implemented by the apparatuses of FIGS. 19 to 23 to be described below. For example, referring to FIG. 20, the one or more processors 202 may control the one or more transceivers 206 and/or the one or more memories 204 to transmit the signal for triggering aperiodic CSI feedback, and the one or more transceivers 206 may transmit the signal for triggering aperiodic CSI feedback to the UE.

The base station may receive aperiodic CSI feedback in response to the trigger signal. The aperiodic CSI may include at least one of PMI and RI. In addition, the aperiodic CSI may be received through the PUSCH.

It is possible to transmit and receive high-resolution codebook-based channel state information while efficiently using uplink resources through the above-described methods and embodiments (e.g. Method 1, Method 2, FIGS. 17, 18, etc.). In addition, the above-described methods and embodiments (e.g. Method 1, Method 2, etc.), the UE and/or the base station operating according to the steps of FIGS. 17 and 18 may be implemented by the apparatuses of FIGS. 19 to 23 to be described below. For example, the base station may correspond to the first wireless device, the UE may correspond to the second wireless device, and vice versa may be considered in some cases.

For example, the above-described base station/UE signaling and operation (e.g. Method 1, Method 2, FIGS. 17, 18, etc.) may be processed by the one or more processors (e.g. 102, 202) of FIGS. 19 to 23, and the above-described base station/UE signaling and operation (e.g. Method 1, Method 2, FIGS. 17, 18, etc.) may be stored in a memory (e.g. one or more memories (e.g. 104, 204) in FIG. 19) in the form of a command/program (e.g. instruction, executable code) for driving at least one processor (e.g. 102, 202) of FIGS. 19 to 23.

Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 19 illustrates a communication system applied to the present disclosure.

Referring to FIG. 19, a communication system (1) applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Devices Applicable to the Present Disclosure

FIG. 20 illustrates wireless devices applicable to the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Signal Processing Circuit Example to which Present Invention is Applied

FIG. 21 illustrates a signal processing circuit for a transmit signal.

Referring to FIG. 21, a signal processing circuit 1000 may include a scrambler 1010, a modulator 1020, a layer mapper 1030, a precoder 1040, a resource mapper 1050, and a signal generator 1060. Although not limited thereto, an operation/function of FIG. 21 may be performed by the processors 102 and 202 and/or the transceivers 106 and 206 of FIG. 20. Hardware elements of FIG. 21 may be implemented in the processors 102 and 202 and/or the transceivers 106 and 206 of FIG. 20. For example, blocks 1010 to 1060 may be implemented in the processors 102 and 202 of FIG. 20. Further, blocks 1010 to 1050 may be implemented in the processors 102 and 202 of FIG. 20 and the block 1060 of FIG. 20 and the block 1060 may be implemented in the transceivers 106 and 206 of FIG. 20.

A codeword may be transformed into a radio signal via the signal processing circuit 1000 of FIG. 21. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 1020. A modulation scheme may include pi/2-BPSK(pi/2-Binary Phase Shift Keying), m-PSK(m-Phase Shift Keying), m-QAM(m-Quadrature Amplitude Modulation), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (1010 to 1060) of FIG. 21. For example, the wireless device (e.g., 100 or 200 of FIG. 20) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource de-mapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Example of a Wireless Device Applied to the Present Disclosure

FIG. 22 illustrates another example of a wireless device applied to the present disclosure. The wireless device may be implemented in various forms according to a use-case/service (refer to FIG. 19).

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 20. For example, the transceiver(s) 114 may include the one or more transceivers 106 and 106 and/or the one or more antennas 108 and 108 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 19), the vehicles (100*b*-1 and 100*b*-2 of FIG. 19), the XR device (100*c* of FIG. 19), the hand-held device (100*d* of FIG. 19), the home appliance (100*e* of FIG. 19), the IoT device (100*f* of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Portable Device Example to which Present Invention is Applied

FIG. 23 illustrates a portable device applied to the present disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 23, a portable device 100 may include an antenna unit 108, a communication unit 110, a control unit 120, a memory unit 130, a power supply unit 140*a*, an interface unit 140*b*, and an input/output unit 140*c*. The antenna unit 108 may be configured as a part of the communication unit 110. The blocks 110 to 130/140*a* to 140*c* correspond to the blocks 110 to 130/140 of FIG. 22, respectively.

The communication unit 110 may transmit/receive a signal (e.g., data, a control signal, etc.) to/from another wireless device and eNBs. The control unit 120 may perform various operations by controlling components of the portable device 100. The control unit 120 may include an Application Processor (AP). The memory unit 130 may store data/parameters/programs/codes/instructions required for driving the portable device 100. Further, the memory unit 130 may store input/output data/information, etc. The power supply unit 140*a* may supply power to the portable device 100 and include a wired/wireless charging circuit, a battery, and the like. The interface unit 140*b* may support a connection between the portable device 100 and another external device. The interface unit 140*b* may include various ports (e.g., an audio input/output port, a video input/output port) for the connection with the external device. The input/output unit 140*c* may receive or output a video information/signal, an audio information/signal, data, and/or information input from a user. The input/output unit 140*c* may include a camera, a microphone, a user input unit, a display unit 140*d*, a speaker, and/or a haptic module.

As one example, in the case of data communication, the input/output unit 140*c* may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140*c*.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and may implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure may be implemented by various means, for example, hardware, firmware, software, or combinations thereof. When embodiments are implemented by hardware, one embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the present disclosure may be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

The method for transmitting channel state information in a wireless communication system of the present disclosure has been described based on an example applied to a 3GPP LTE/LTE-A system and a 5G system (new RAT system), but the method may be applied to various other wireless communication systems.

The invention claimed is:

1. A method for reporting channel state information (CSI) by a user equipment (UE) in a wireless communication system, the method comprising:
receiving CSI reporting-related configuration information from a base station;
wherein a report for at least one of aperiodic CSI, periodic CSI, or semi-persistent CSI is configured based on the CSI reporting-related configuration information,
calculating first information and second information for a channel quality, based on the CSI reporting-related configuration information;
wherein the first information is calculated by applying a precoding matrix indicator (PMI) included in latest aperiodically reported CSI, and the second information is calculated by applying the PMI at a time of calculation of the second information, and
determining at least one of whether to transmit a flag and a value of the flag, based on the first information and the second information; and
transmitting the CSI to the base station based on the first information and the flag.

2. The method of claim 1, wherein the CSI corresponds to the report on the periodic CSI or the semi-persistent CSI.

3. The method of claim 1, wherein whether to transmit the flag is determined by transmitting the flag when a difference between the first information and the second information is greater than or equal to a specific value.

4. The method of claim 3, wherein the specific value is configured by the base station.

5. The method of claim 1, wherein the CSI includes the first information and the flag.

6. The method of claim 5, wherein the value of the flag is determined by comparing a difference value between the first information and the second information and a specific value.

7. The method of claim 6, wherein the flag consists of 1 bit, i) when the difference between the first information and the second information is greater than or equal to the specific value, 1 is transmitted, and ii) when the difference between the first information and the second information is less than the specific value, 0 is transmitted.

8. The method of claim 6, wherein a plurality of the specific values are configured, and the value of the flag indicates whether the difference value between the first information and the second information is greater than or equal to a specific value among the plurality of specific values.

9. The method of claim 5, wherein a plurality of sets consisting of candidate values of a difference value between the first information and the second information are configured,
the flag consists of two or more bits, and
the value of the flag indicates a set corresponding to the difference value between the first information and the second information among the plurality of sets.

10. The method of claim 5, wherein when the CSI corresponds to a subband report,
the first information is reported in subband units, and the flag is reported in wideband units.

11. The method of claim 5, further comprising:
receiving a trigger signal for the report on the aperiodic CSI from the base station, and
wherein the trigger signal is transmitted from the base station based on the flag.

12. The method of claim 11, further comprising:
transmitting the aperiodic CSI to the base station in response to the trigger signal, and
wherein the aperiodic CSI includes at least one of the PMI and RI.

13. A user equipment (UE) for reporting channel state information (CSI) in a wireless communication system, the UE comprising:
a transceiver configured to transmit and receive a radio signal, and
a processor functionally connected to the transceiver, wherein the processor is configured to:
receive CSI reporting-related configuration information from a base station by controlling the transceiver,
wherein a report for at least one of aperiodic CSI, periodic CSI, or semi-persistent CSI is configured based on the CSI reporting-related configuration information,
calculate first information and second information for a channel quality, based on the CSI reporting-related configuration information,
calculate the first information by applying a precoding matrix indicator (PMI) included in latest aperiodically reported CSI, and calculate the second information by applying the PMI at a time of calculation of the second information, and
determine at least one of whether to transmit a flag and a value of the flag, based on the first information and the second information, and
report the CSI to the base station based on the first information and the flag.

14. The UE of claim 13, wherein it is determined by transmitting the flag when a difference between the first information and the second information is greater than or equal to a specific value.

15. The UE of claim 13, wherein the CSI includes the first information and the flag.

* * * * *